United States Patent
Dixon et al.

[11] Patent Number: 6,058,598
[45] Date of Patent: May 9, 2000

[54] CONTROL SYSTEM FOR AN ASSEMBLY TOOL

[75] Inventors: Richard D. Dixon, Woodstock; David N. Rosen, Boiceville; Thomas R. Kingsbury, Saugerties, all of N.Y.

[73] Assignee: Huck International, Inc.

[21] Appl. No.: 09/061,870

[22] Filed: Apr. 17, 1998

Related U.S. Application Data

[60] Provisional application No. 60/044,738, Apr. 18, 1997.

[51] Int. Cl.[7] .............................. B23P 21/00; B23Q 15/00
[52] U.S. Cl. ................................. 29/714; 29/709; 29/715; 29/818
[58] Field of Search .............................. 29/709, 714, 715, 29/809, 818; 221/167, 168, 171

[56] References Cited

U.S. PATENT DOCUMENTS

| | | | |
|---|---|---|---|
| 2,725,971 | 12/1955 | Clark-Riede | 198/33 |
| 2,806,494 | 9/1957 | Kull . | |
| 3,081,885 | 3/1963 | Carlzen et al. . | |
| 3,414,111 | 12/1968 | Ernest . | |
| 3,452,418 | 7/1969 | Ernest et al. . | |
| 3,872,530 | 3/1975 | Festerling . | |
| 3,893,217 | 7/1975 | Edmond | 29/407 |
| 3,929,176 | 12/1975 | Dixon . | |
| 3,946,926 | 3/1976 | Willis . | |
| 3,961,408 | 6/1976 | Goodsmith et al. . | |
| 4,048,687 | 9/1977 | Kato et al. . | |
| 4,164,072 | 8/1979 | Shinjo . | |
| 4,369,570 | 1/1983 | Madden et al. . | |
| 4,529,315 | 7/1985 | Cohen et al. . | |
| 4,605,150 | 8/1986 | Ikehara . | |
| 4,662,053 | 5/1987 | Aceti et al. . | |

(List continued on next page.)

FOREIGN PATENT DOCUMENTS

| | | |
|---|---|---|
| 0191663A2 | 8/1986 | European Pat. Off. . |
| 0423766A2 | 4/1991 | European Pat. Off. . |
| 0720958A1 | 7/1996 | European Pat. Off. . |
| 0729813A1 | 9/1996 | European Pat. Off. . |
| 4012918 | 10/1990 | Germany . |
| 5-90309 | 4/1993 | Japan . |
| 8-174509A | 7/1996 | Japan . |
| 654780 | 3/1986 | Switzerland . |

*Primary Examiner*—David P. Bryant
*Assistant Examiner*—Jermie E. Cozart
*Attorney, Agent, or Firm*—Harness, Dickey & Pierce, P.L.C.

[57] ABSTRACT

A control system for an assembly tool includes sensors which monitor the status of the tool at each step of operation and a controller receives signals from the sensors to ensure proper status in any given step. The tool includes a collar transfer device which receives a fastener collar from a remote collar sending unit and transfers the collar to a collar-swaging assembly which moves the collar to a cooperating fastener pin and swages the collar onto the pin. The sensors of the system monitor the position of the collar transfer device, the presence or absence of a collar in the collar transfer device, the position of the swaging assembly, the presence or absence of a collar in the swaging assembly, and the presence or absence of a fastener pin of proper length in a position to be engaged by the collar. The sensors include optical sensors which sight through apertures formed through components of the tool when the components are in specified positions to verify that the components are in the specified positions. Collars supported in collar holding members block sight apertures formed through the members to indicate the presence of the collar in the holding member. The sensors also include a microswitch positioned with respect to a moving component to be engaged when the component is in a switch-engaging position. A sending unit for feeding radially-flanged collars to the assembly tool includes a sorting unit which arranges the collars one behind the other with their flanges down at a termination point of the sorting unit at which point a sending unit, upon receiving the proper signal from the controller, captures one collar at a time and sends the collar through a collar transport conduit to the assembly tool.

24 Claims, 23 Drawing Sheets

U.S. PATENT DOCUMENTS

| | | |
|---|---|---|
| 4,672,866 | 6/1987 | Riera et al. . |
| 4,751,863 | 6/1988 | Watanabe . |
| 4,765,524 | 8/1988 | Yoshieda . |
| 4,791,715 | 12/1988 | Lovelace . |
| 4,805,110 | 2/1989 | Takahashi et al. . |
| 5,014,876 | 5/1991 | Young et al. . |
| 5,119,548 | 6/1992 | Schanstra . |
| 5,133,635 | 7/1992 | Malin et al. . |
| 5,206,985 | 5/1993 | Tsukihashi et al. . |
| 5,237,733 | 8/1993 | Ladouceur et al. ................ 29/432.2 |
| 5,283,943 | 2/1994 | Aguayo et al. . |
| 5,291,645 | 3/1994 | Aoyama . |
| 5,323,531 | 6/1994 | Leistmer et al. ...................... 29/798 |
| 5,327,623 | 7/1994 | Noel . |
| 5,336,935 | 8/1994 | Shitanda et al. . |
| 5,392,954 | 2/1995 | Gartz . |
| 5,515,599 | 5/1996 | Best . |
| 5,533,250 | 7/1996 | Ladouceur ............................ 29/702 |
| 5,553,737 | 9/1996 | Kelly .................................... 221/167 |
| 5,727,300 | 3/1998 | Ekdahl et al. ..................... 29/407.04 |

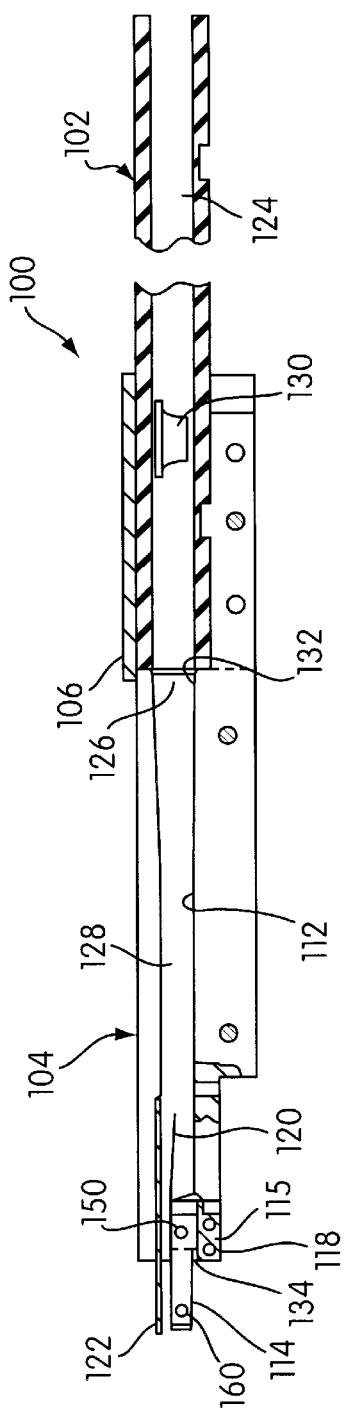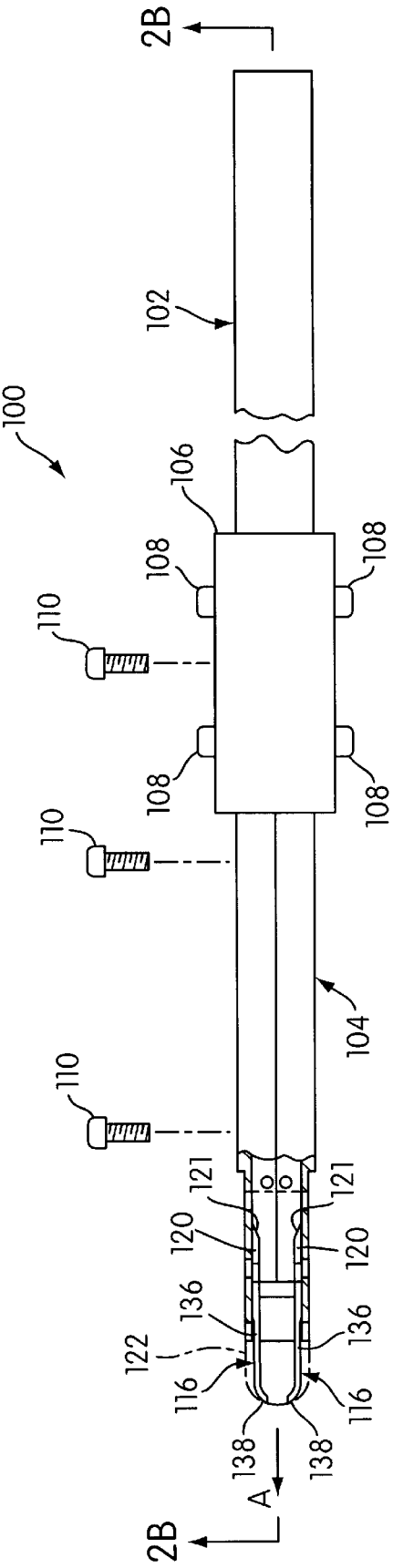
FIG. 2B
FIG. 2A

CONTROL SYSTEM FOR AN ASSEMBLY TOOL

This application claims the benefit of prior filed provisional application serial number 60/044,738, filed Apr. 18, 1997.

FIELD OF THE INVENTION

The present invention relates to a control system for a tool and, more particularly, to an assembly tool including the control system. The invention is applicable to tools of the type where the tool is adapted to perform an operation on a work piece such as attaching a member such as a fastener to the work piece.

BACKGROUND OF THE INVENTION

In continuing efforts to automate manufacturing steps and to increase productivity, the prior art has developed a number of control systems for manufacturing operations which vary from the simple to very complex. Many of these have included sensing devices to record the status of the operations at various time intervals and locations and to provide data to a controller such as a computer or other type of timing and sequencing device. In many automated assembly procedures, one of the tool or the work piece is moved through a sequence of work stations or locations where the programmed operation is carried out. With increasing throughput speeds, one difficulty that arises involves the misalignment of one or more of the sensing devices which causes work slowdown or even stoppage to allow realignment to be effected. Another difficulty arises particularly with optical sensing devices where occlusion of the optical path occurs which requires clearing of the optical path with its attendant delays.

In complex operations such as those involving the feeding of a part at a precise time to a work site, proper functioning of the sensing devices is often critical to safe and effective operation of the tools and conveying system being controlled. However, the speed of operation and the character of the operation such as, for example, reciprocating motion of a tool member, often results in significantly increased costs in installing the control system to ensure a sufficiently long operational run before resetting or adjustment is mandatory. Where optical sensors are employed, in some of the prior art arrangements, either a photocell or a light reflecting member has been placed on a tool moving member. In article conveyors, it has been the practice to place such sensing elements adjacent the path of a member that is to be fed to a tool to control the feeding sequence. In both circumstances, frequent resetting, clearing, cleaning and adjustment of the sensing devices are necessary. As an alternative to avoid the loss of production time, reinforcement of the work station implements to minimize the occurrence of misalignment of the sensing devices has been proposed or automatically operated realignment backup systems have been employed. In either case, the increase in cost, particularly where heavy machinery is being operated, has been a significant disadvantage. In some arrangements, increased expense has been encountered due to the requirement of modifying the tools and conveying systems to enable these elements to accommodate the sensing devices.

SUMMARY OF THE INVENTION

The present invention provides a control system that is characterized by its simplicity and high degree of reliability as well as its adaptability to a wide range of tools and conveying systems. More specifically, the present invention provides a control system using optical sensors and light sources which are not attached to the members being controlled but can be located a suitable distance from the equipment to thereby avoid misalignment problems of the prior art. Also, maintenance of the integrity of the system can be effected at much lower cost than the prior control systems.

In one embodiment, a working tool that is moved such as along a reciprocating path is provided with one or more apertures corresponding to different positions of the tool during its stroke. One or more radiation sources are located so as to illuminate an aperture when the tool is in a selected position. A corresponding number of radiation detectors are located to receive the radiation when the radiation passes through a selected aperture. The detection of the radiation from the one or more locations will serve to provide a signal to the computer which will be programmed to respond by sending control signals to the actuator or motor for the tool and any associated conveying system which may be provided with controlling apertures and radiation source or sources and detectors to carry out the desired sequence of operations as the tool moves between selected positions and the conveying system is operated to supply articles to the work site or the tools as required.

As will become more apparent from the description that follows, the system of the present invention will enable relatively inexpensive installation and highly reliable operation for extended intervals with a minimum of adjustment as compared to prior systems.

Other objects, features, and characteristics of the present invention will become apparent upon consideration of the following description and the appended claims with reference to the accompanying drawings, all of which form a part of the specification, and wherein like reference numerals designate corresponding parts in the various figures.

DESCRIPTION OF THE DRAWINGS

FIG. 2A is top view of the collar transfer device of the ACFD of FIG. 2B;

FIG. 2B is a cross-sectional view of collar transfer device of the ACFD incorporating aspects of the present invention taken in the direction 2B—2B in FIG. 2A;

FIG. 18A is a partial cross section along line 18A—18A in FIG. 18;

FIG. 18B is a partial cross section along line 18B—18B in FIG. 18;

DETAILED DESCRIPTION OF THE PREFERRED EMBODIMENT

A. Automatic Collar Feed Device ("ACFD")

For convenience in the following description, various directional or other spatial references are made with regard to references to the drawings. It is understood, however, that such references, including without limitation, upper, lower, top, bottom, left, right, lateral, or longitudinal, are made for convenience only and should not be construed to be limiting on the invention described herein.

Figure 1:
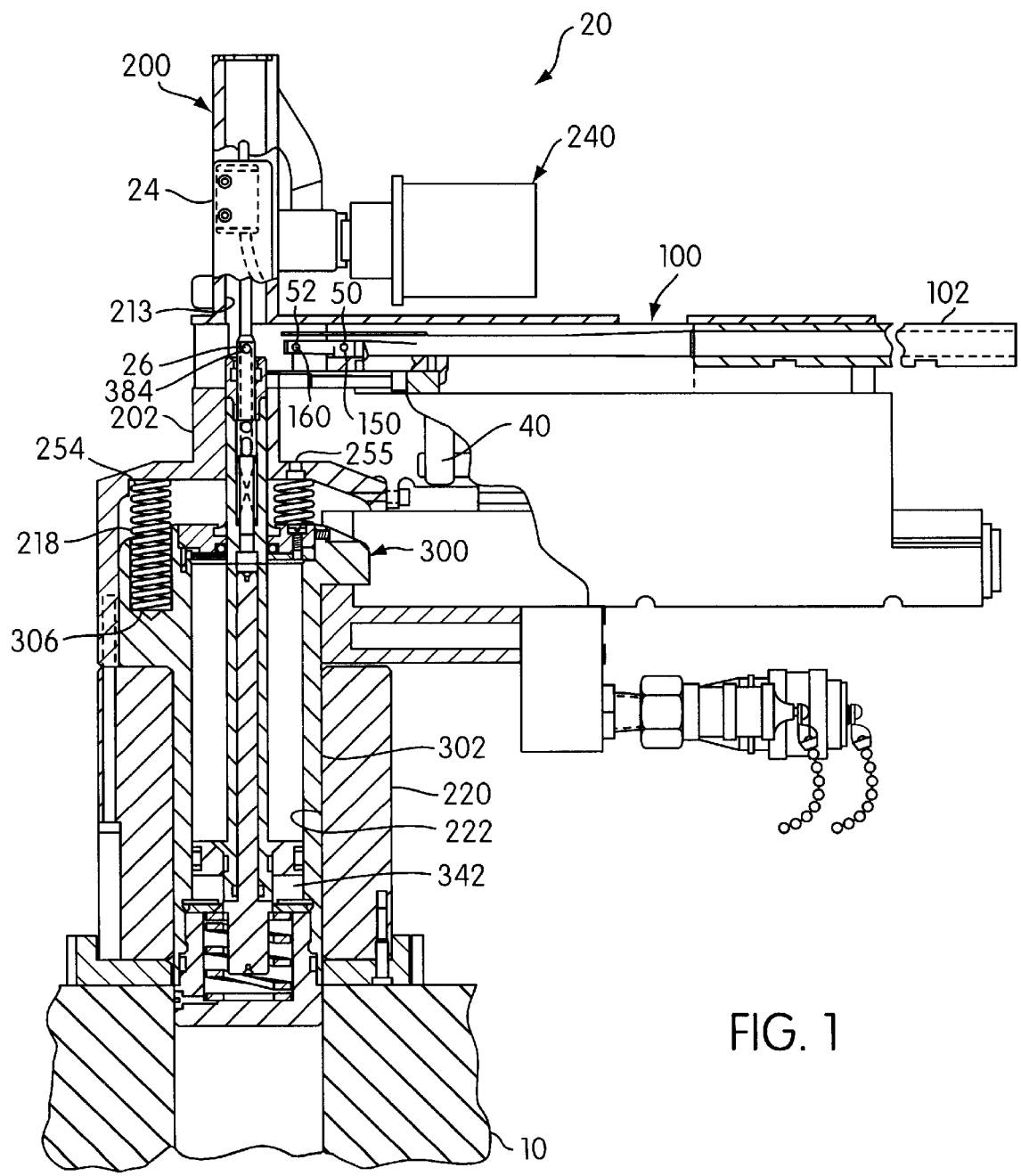
FIG. 1 is a view in elevation, partially in cross-section, of an automatic collar feed device (ACFD), attached to a drill-rivet machine, incorporating aspects of the present invention.

An assembly tool in the form of an automatic collar feed device (ACFD) incorporating aspects of the present invention and designated generally by reference number 20 is shown in FIG. 1. The ACFD 20 can be installed on a conventional drill-rivet machine 10 and used to install two-piece lockbolts and flange-based collars in a high production rate, sequentially operating environment. The ACFD of the present invention may bring a fastener element, such as a collar, up to a cooperating fastener element, such as a fastener pin, and swage the collar onto the pin once every 2½ seconds. The device is especially adapted for installing two piece fasteners, such as those disclosed in U.S. Pat. No. 4,472,096, the disclosure of which is hereby incorporated by reference. The ACFD 20 of the present invention works in conjunction with the drill-rivet machine, a programmable logic controller (PLC), a specially adapted air-hydraulic manifold, and a "single shot" collar sorting/sending unit. (See FIG. 23).

The ACFD 20 includes three major subassemblies which will be described in detail below. These subassemblies are the collar transfer device 100, which functions as a fastener element transfer device, and the clamp assembly 200 and the anvil cylinder assembly 300, which together operate as a fastener element installing mechanism. The ACFD preferably also includes a vacuum collection assembly 240 to collect debris and prevent the debris from entering the internal workings of the ACFD.

Operation of the ACFD is controlled by a series of status indicators, preferably in the form of sensors and switches which ensure that the tool is aligned and that each internal component has assumed its proper position and that the proper fastener component is in its proper position before the next sequential operation is commenced. Preferred sensors are photoelectric optical sensors comprising an emitter which emits a light beam and a receiver which receives the beam. The sensor is considered "detected" when the emitter's beam is received by the receiver. The emitter and receiver are generally disposed in an opposed, spaced apart orientation, with the emitter facing the receiver. Although not used in the presently preferred embodiment, it is within the contemplation of the present invention to use emitters and receivers in conjunction with mirrors or other reflectors if structural constraints require that the emitter and receiver be offset from each other. Preferred sensors are Allen-Bradley sensors; the part number for an emitter/receiver pair is 42KA-T2KNHK-A2.

The collar transfer device 100 is shown in detail in FIGS. 2A and 2B. In general, the collar feed device 100 includes a collar feed tube 102 which transfers collars one at a time from a sending unit, to be described below, a collar track member 104, a feed tube retainer structure 106 attaching the feed tube 102 to the collar track member 104, and a collar shuttle 114.

Collar feed tube 102 comprises an elongated tubular member, preferably composed of durable flexible material, such as polyurethane. Feed tube 102 includes a collar passage 124 extending therethrough. Passage 124 is preferably rectangular in shape having a width and height permitting a collar 130 to pass therethrough, flange side up, as shown.

Collar track member 104 is preferably composed of aluminum and is preferably of a rectangular outer cross section. Collar track 104 is preferably of a two piece construction split along the longitudinal length thereof and can be held together by means of a plurality of suitable fasteners 110. Extending lengthwise through the collar track 104 is a collar passage 112, also preferably having a rectangular cross-section for permitting a collar 130 to pass therethrough flange side up. Collar passage 112 includes an initial flared section 126, which is flared toward the entrance 132 of the passage 112 to facilitate entry of collars into the passage. Passage 112 also includes a straight section 128 which directs the collar 130 toward the exit 134 of the passage 112.

As a collar passes through straight section 128 of the collar passage 112 toward the exit 134, the collar first encounters a collar flange guide 120. Collar flange guide 120 comprises two narrow lips extending from the outer side walls of the collar track 104 into the passage 112. Each lip of the guide 120 preferably includes an initial angled section 121 for directing the collar 130 toward the centerline of the passage. Further, the collar flange guide 120 is angled slightly upwardly toward the top of the collar shuttle 114. As can be appreciated from FIG. 2B, as a collar passes through collar passage 112, the flange of the collar rides up on the collar flange guide 120 so that the collar is directed toward the top of the collar shuttle 114.

A collar track cover 122 is preferably disposed above the shuttle 114 and the collar guide 120 so as to keep the collars from being dislocated upwardly from the collar shuttle 114.

As mentioned above, the collar feed tube 102 is attached to the collar track member 104 by means of the feed tube retainer 106, which is attached to the collar track member 104 by means of a plurality of fasteners 108.

The collar shuttle 114 functions as a holding member for the fastener element, e.g., the collar, and is preferably formed of a high strength steel material, such as maraging steel, and is attached at the exit 134 of the collar passage 112 of the collar track member 104. Collar shuttle 114 includes two shuttle spring arms 116 extending substantially longitudinally from the end of the collar track member 104. An attachment flange 115 extends downwardly from one end of the shuttle spring arms 116. The shuttle 114 is attached to the collar track member 104 by means of suitable fasteners 118 extending through the attachment flange 115 into the collar track member 104. The shuttle spring arms 116 include two longitudinal substantially parallel portions 136 that terminate in inwardly bent portions 138. The distance between the tips of the inwardly curved portions 138 is less than the outer diameter of the body of the collar 130. The spring arms 116 have sufficient stiffness so that when a collar 130 is sent through the collar passage 112, it is captured by the curved portions 138 of the spring arms 116. The shuttle spring arms 116 are outwardly flexible so that upon the application of a sufficient force in the direction indicated by Arrow A, the inwardly bent portions 138 will be forced apart by the main body of the collar 130 so as to permit the collar 130 to pass between the inwardly bent portions 138 of the shuttle spring arms 116.

The collar shuttle 114 includes a forward shuttle aperture 160 extending laterally through both arms 116 of the shuttle 114. In addition, a rear shuttle aperture 150 extends laterally through the collar track member 104 and both arms 116 of the collar shuttle 114.

The collar transfer device 100 is extended and retracted by means of a pneumatic piston actuator 40 (see FIG. 1) which cooperates with the collar track member 104 to function as a moving body of the collar shuttle 114.

Figure 3:
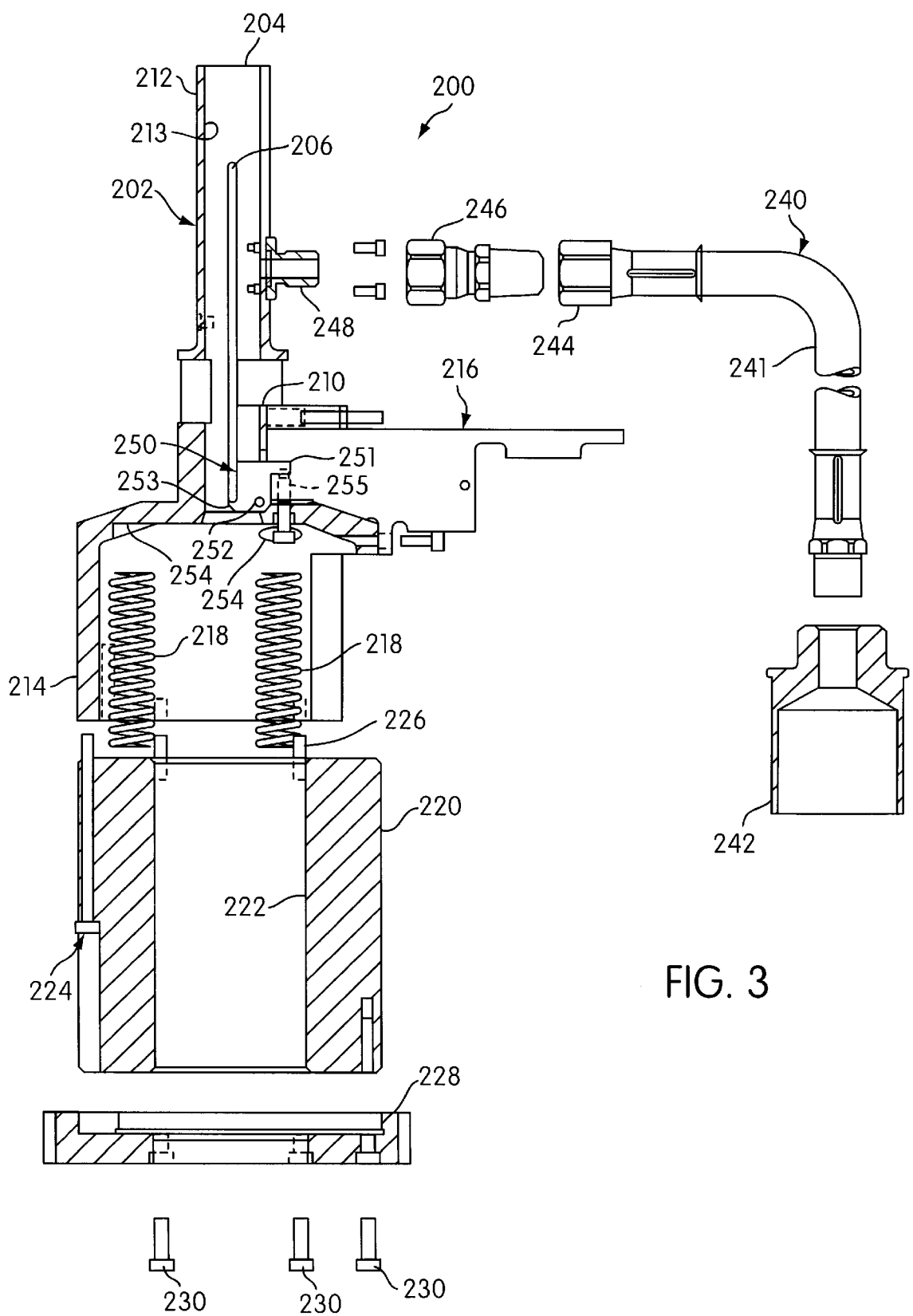
FIG. 3 is an exploded elevational view, partially in cross-section, of a clamp housing assembly of the ACFD incorporating aspects of the present invention.

Details of the clamp assembly 200 are shown in FIG. 3. Clamp assembly 200 includes a clamp housing 202 having an upper narrow portion 212 and a lower enlarged spring housing portion 214. Upper portion 212 of clamp housing 202 defines an anvil passage 213 therethrough. Aligned longitudinal slots 206 extends along opposite outer walls of the upper portion 212 of the clamp housing 202. A central opening 204 is provided at the top of the upper portion 212 of the clamp housing 202. Upper portion 212 of the clamp housing 202 also includes a collar reception opening 210 extending laterally into the anvil passage 213. The collar transfer device 100 is extendible into the collar reception opening 210 so as to place a collar into the anvil passage 213.

A spacer member 220 defines a cylindrical bore 222 longitudinally therethrough. The spacer member 220 is disposed below the spring housing portion 214 of the clamp housing 202 and is attached to the clamp housing 202 by means of suitable fasteners, such as bolt 224. In addition, a plurality of locating dowels 226 are preferably provided to assist in precisely locating the clamp housing 202 above the spacer member 220.

The spring housing portion 214 of the clamp housing 202 houses a plurality of springs 218, three being preferred. Springs 218 are seated at the upper ends thereof in spring seats 254 formed in the upper interior of the spring housing portion 214 of the clamp housing 202.

In the full assembly of the ACFD 20, the collar transfer device 100 is supported on a collar track support structure 216 extending laterally outwardly from a side of the clamp housing 202. A bayonet flange 228 is fixed to the bottom end of the spacer member 220 preferably by means of suitable fasteners 230 and is disposed between the spacer member 220 and the table of the drill-rivet machine (not shown).

An anvil-down switch assembly comprises a toggle switch linkage 250 pivotally mounted on toggle pivot pin 252 in the interior of the clamp housing 202 proximate a lower end of the longitudinal slot 206. The switch linkage 250 is preferably a spring biased pivotable linkage having flange extensions 251 and 253. Flange extension 251 is engageable with a microswitch 255. The linkage 250 is biased so that flange extension 251 presses microswitch 255 into an off position and is pivoted so as to trip the microswitch 255 by full downward movement of a member of the ACFD extending laterally through slot 206 and engaging the flange 253 as will be described below.

An internal vacuum hose assembly 240 is preferably provided to collect debris so as to prevent them from entering into the moving components of the ACFD and, equally importantly, to prevent the debris from obstructing any of the optical sensors employed in conjunction with the present invention. The preferred embodiment of hose assembly 240 may include a length of hose 241 having a vacuum hose adapter 242 coupled to one end thereof. The vacuum hose adapter 242 permits the hose assembly 240 to be coupled with a suitable vacuum machine. Hose assembly 240 may also include a hose connector 244 and an adapter fitting 246 for attaching the hose assembly 240 to a vacuum attachment plate 248 attached to the side of the upper portion 212 of the clamp housing 202. As can be appreciated from FIG. 3, with the hose assembly 240 installed, a vacuum machine (not shown) is in communication with the anvil passage 213 defined within the upper portion 212 of the clamp housing 202 and can collect debris which falls into the passage 213.

Figure 4:
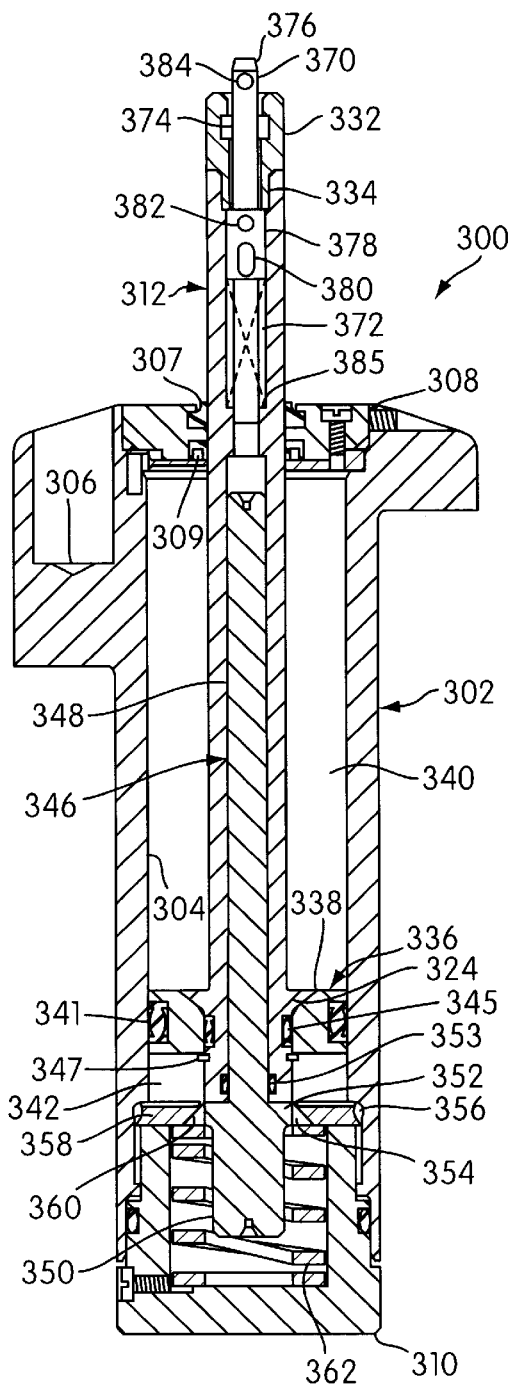
FIG. 4A is a longitudinal cross-sectional view of an anvil piston assembly of the ACFD incorporating aspects of the present invention.
FIG. 4B is a longitudinal cross sectional view of an anvil piston and locator pin of the anvil piston assembly shown in FIG. 4A.
FIG. 4C is an elevational view of the locator pin of the anvil piston assembly shown in FIG. 4A.

Details of the anvil cylinder assembly 300 and its subcomponents are shown in FIGS. 4A–4C. The anvil cylinder assembly 300 includes an anvil cylinder 302 defining an inner cylindrical bore 304 therethrough. As shown in FIG. 1, the anvil cylinder 302 of the anvil cylinder assembly 300 fits within the cylindrical bore 222 of the spacer member 220 of the clamp assembly 200.

A plurality of spring seats 306 are provided in the upper end of the anvil cylinder 302. As can be appreciated from FIG. 1 and from FIG. 3, the spring seats 306 receive the springs 218 housed in the spring housing portion 214 of the clamp housing 202.

The anvil cylinder 302 is closed at the upper end thereof by an upper piston stop 308 and at the bottom end thereof by an end cap 310.

As shown in FIGS. 4A and 4B, extending through the inner bore 304 in a generally coaxial relationship with respect thereto is an anvil piston 312. The anvil piston 312 is an elongated, substantially cylindrical member having a longitudinal bore extending therethrough. The inner bore of the anvil piston 312 includes a threaded anvil receiving portion 322 having interior threads. As shown in FIG. 4A, an anvil 332 having a collar portion 334 having exterior threads is screwed into the anvil receiving portion 322 of the anvil piston 312. Below the anvil receiving portion 322, the anvil piston bore includes an upper portion 314 and a lower portion 318 with an intermediate portion 316 being of an interior diameter less than either the upper portion 314 or the lower portion 318. The anvil piston 312 also includes a radially extending beveled flange 324 extending about the periphery thereof proximate an end of the piston opposite the anvil receiving portion 322. The anvil piston 312 also includes outer O-ring groove 326, inner O-ring groove 328, and an outer ring groove 330, the respective functions of which will be described below.

As shown in FIG. 4A, the anvil piston 312 is disposed coaxially within the inner bore 304 of the anvil cylinder 302 and extends through a center aperture formed through the upper piston stop 308. Wipers or other suitable seals 307, 309 are preferably provided between the upper piston stop 308 and the anvil piston 312 to effect a fluid-tight seal therebetween. One end of the anvil piston 312 extends through an anvil piston head 336, the beveled flange 324 of the anvil piston 312 engaging a like shaped beveled seat 338 formed in the anvil piston head 336. The anvil piston head 336 divides the inner bore 304 of the anvil cylinder 302 into an anvil-down chamber 340 and an anvil-up chamber 342, and the anvil piston 312 and the anvil piston head 336 together comprise a piston head and a piston shaft.

The anvil piston head 336 preferably includes O-rings or other seals 341 extending around the outer periphery thereof so as to effect a fluid tight seal between the outer periphery of the anvil piston head 336 and the inner surface of the inner bore 304. In addition, O-rings 345 are provided in the outer O-ring groove 326 of the anvil piston so as to effect a fluid-tight seal between the anvil piston head 336 and the anvil piston 312. The anvil piston head 336 is secured in a position in which the beveled flange 324 of the anvil piston 312 is seated in the beveled seat 338 of the anvil piston head 336 by means of a retaining ring 347 snapped into outer ring groove 330 formed in the anvil piston 312.

A spring rod 346 extends into the anvil piston 312 in the lower bore section 318. The spring rod 346 includes a first cylindrical portion 348 having an outer diameter providing a clearance fit between the first cylindrical portion 348 and the lower bore portion 318 of the anvil piston 312. Spring rod 346 further includes a lower portion 350 having an outer diameter greater than the inner diameter of the lower portion 318 of the anvil piston bore, the transition between the upper portion 348 of the spring rod 346 and the lower portion 350 defining a shoulder 352 which engages an annular end of the anvil piston 312 to limit the insertion of spring rod 346 into anvil piston 312. Anvil piston 312 further includes a beveled, fluted radial flange 354 extending about the periphery of the spring rod 346 proximate the shoulder 352. An O-ring seal 353 disposed in the inner O-ring groove 328 of the anvil piston 312 effects a fluid-tight seal between the spring rod 346 and the anvil piston 312.

A stop washer 358 is disposed within the inner bore 304 of the anvil cylinder 302. The washer 358 is seated in an annular shoulder 356 formed about the periphery of the inner bore 304 and is held in place by the end cap 310. The stop washer 358 has a central aperture formed therethrough through which the spring rod 346 extends. The beveled fluted flange 354 of the spring rod 346 engages a beveled seat 360 formed about the central aperture in the stop washer 358. As can be appreciated from FIG. 4A, upward movement of the spring rod 346 is limited by engagement of the beveled flange 354 with the beveled seat 360.

The stop washer 358 and the end cap 310 define a substantially enclosed space in which a die spring 362, extending from the stop washer 358 to the bottom of the end cap 310, is disposed.

Disposed within the upper portion 314 of the anvil piston bore is a locator pin 370. As shown in more detail in FIG. 4C, locator pin 370 includes a lower portion 372 and an upper portion 374, preferably having substantially similar outer diameters, with an enlarged intermediate shoulder portion 378 disposed therebetween. The free end of upper portion 374 preferably includes a beveled edge 376. Locator pin 370 includes an upper aperture 384 extending diametrically through upper portion 374 and a lower aperture 380 extending diametrically through intermediate shoulder portion 378. Upper aperture 384 is preferably in the form of a circle while lower aperture 380 is preferably formed as an ellipse. Finally, locator pin 370 includes a dowel pin aperture 382.

Referring again to FIGS. 4A and 4B, the locator pin 370 is disposed in the upper portion 314 of the anvil piston bore. The diameter of the shoulder 378 of the locator pin provides a clearance fit between the shoulder 378 and the inner surface of the upper portion 314 of the bore. In addition, the diameter of the lower portion 372 of the locator pin 370 provides a clearance fit between the lower portion 372 and intermediate portion 316 of the anvil piston bore. As can be appreciated, the clearance fit of the locator pin shoulder 378 with the upper portion 314 of the anvil cylinder bore and the clearance fit of the lower portion 372 of the locator pin and the intermediate portion 316 of the anvil cylinder bore keeps the locator pin positively centered and coaxial with respect to the anvil piston 312.

The section of the upper portion 314 of the anvil piston bore between the locator pin shoulder 378 and the intermediate portion 316 of the anvil piston bore defines an annular space within which a circular spring 385 is disposed. Spring 385 urges locator pin 370 upwardly. Upward travel of the locator pin 370 is limited, however, by interference by the anvil 332 with the intermediate shoulder 378. The upper portion 374 of the locator pin 370 extends through a central aperture formed through the anvil 332.

As shown in FIG. 4B, a pin 386 is press fit through dowel pin aperture 382 formed in the shoulder 378 of locator pin 370. Pin 386 extends on either side of the locator pin and extends through a slot 320 formed in the anvil piston 312. Pin 386 prevents the locator pin 370 from rotating about its own axis with respect to anvil piston 312.

B. Air-Hydraulic Manifold

Figure 22A:
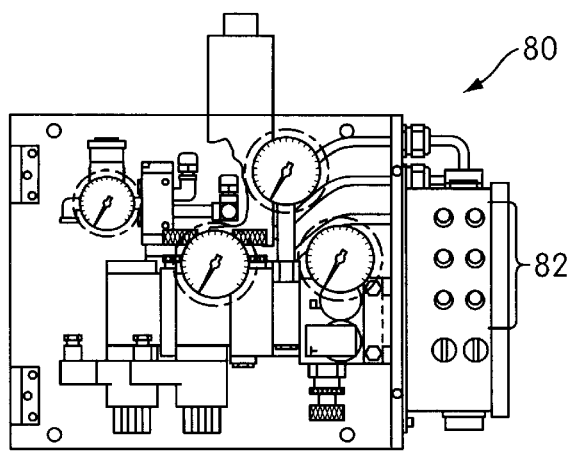
FIG. 22A is a side elevation of an air-hydraulic manifold used in conjunction with the present invention.
Figure 22B:
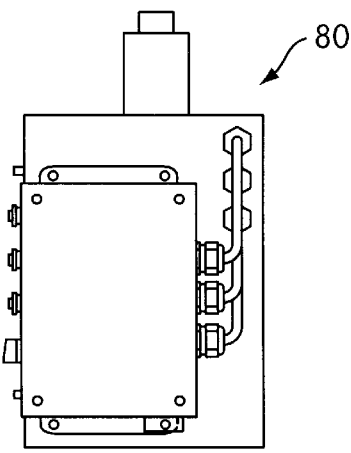
FIG. 22B is an end view of the air-hydraulic manifold shown in FIG. 22A.
Figure 22C:
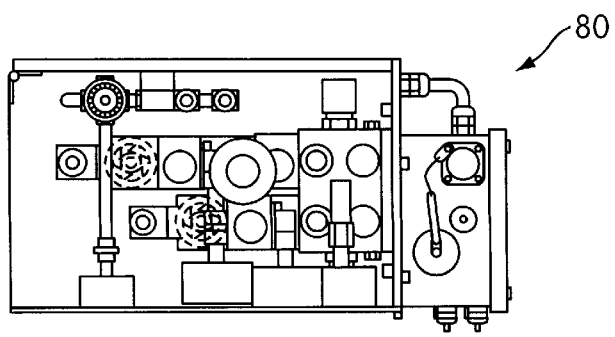
FIG. 22C is a top view of the air-hydraulic manifold shown in FIG. 22A.

In the preferred mode of carrying out the present invention, an air-hydraulic manifold 80, shown in FIG. 22A, is the main interface between the ACFD and the drill-rivet machine's electrical, pneumatic, and hydraulic systems. The manifold is preferably connected to the drill-rivet machine via a thirty conductor cable (not shown) to the machine control system. The hydraulic connection supplies system operating pressure to the manifold directly from the drill-rivet machine's pump through an isolation valve and filter assembly (not shown). The manifold also has a return line (not shown) back to the machine's hydraulic reservoir.

The manifold 80 preferably includes an accumulator, a regulator, a restrictor, and a check valve, as well as two 3-way hydraulic spool valves to control anvil-up and anvil-down/collar eject operations. The manifold preferably also includes a 4-way air valve to control the pneumatic actuator 40 that extends and retracts the collar transfer device 100.

A feature of the manifold 80 is the provision of indicator lamps 82 on the exterior of the manifold to permit an operator to visually check the status of the ACFD. The manifold includes an indicator lamp for each sensor and for the collar strip switch. Each lamp is preferably a press-to-test lamp so that the operator can quickly and easily verify that each lamp is operational.

The manifold 80 preferably also includes a shuttle test switch for extending and retracting the collar transfer device 100 and an anvil test switch for raising and lowering the anvil assembly for testing purposes. The manifold preferably also includes 0–3000 psi gauges for monitoring incoming system pressure, ejection pressure, and upset check pressure.

The manifold preferably also includes a 16-pin electrical MS connector (for older style ACFDs) and/or a 16-pin electrical LEMO connector (for newer style ACFDs) and a 30-pin electrical cable to the machine electrical control system.

In conventional manifolds, which typically include a shuttle extend and (shuttle retract indicator lamp as well as a pressure lamp to monitor anvil-up/down status, the status lamps are connected in parallel with the switch whose status it indicates. Conventional manifolds, however, cannot work with the sensors used in the present invention because the high amperage drawn by each indicator lamp could give the associated photo-electric sensor a false detect and/or damage the sensor. In the present invention, the signal developed at the sensor is sent directly to the PLC which sends a confirmation signal to the proper indicator lamp.

The present manifold 80 also is simplified in design by separating the electronics, hydraulics, and pneumatics, which, in conventional manifolds, are intermingled.

C. Status Sensors

Figure 23:
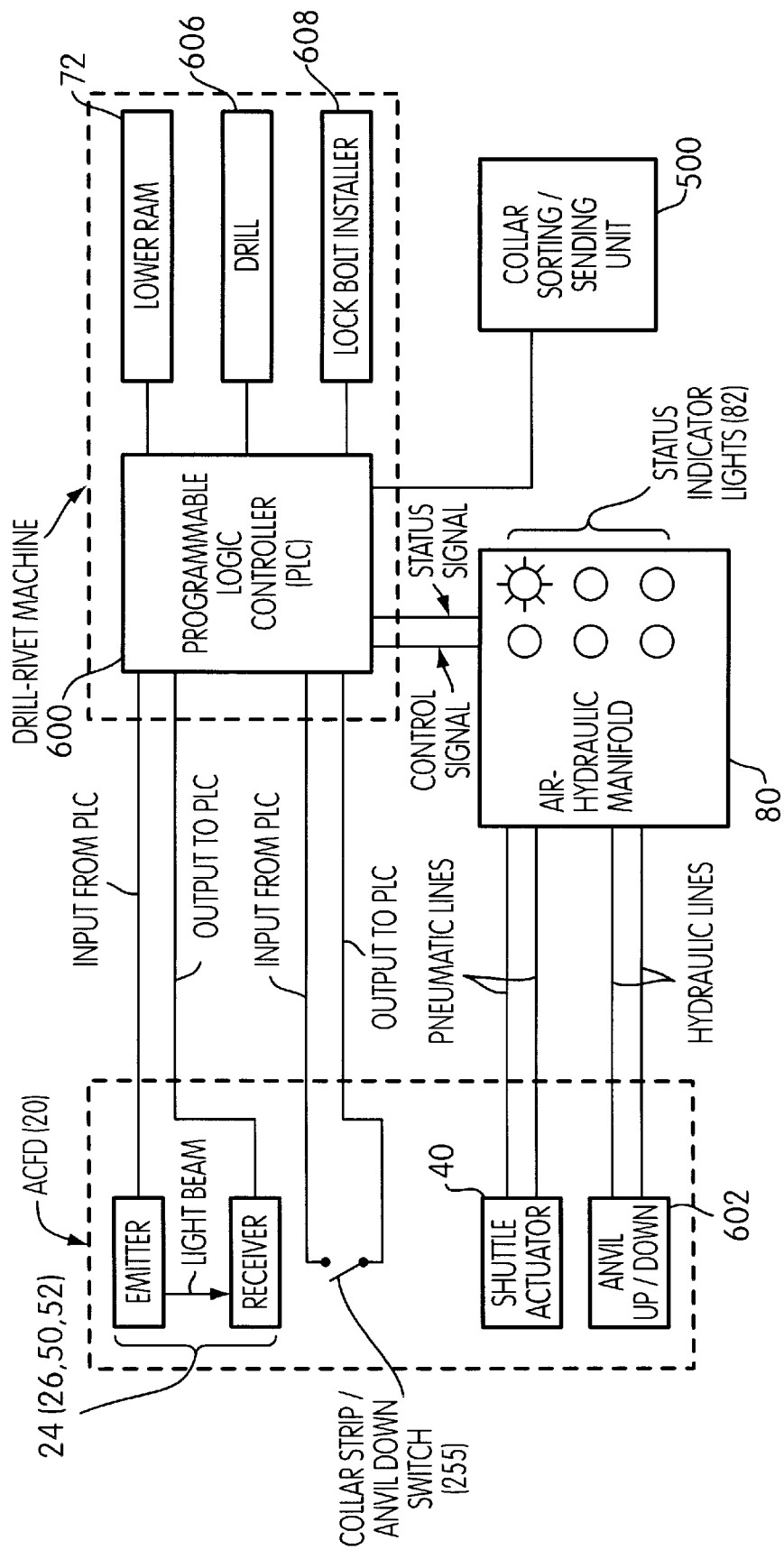
FIG. 23 is a schematic block diagram of the control system of the present invention.

The sensors and switches operate as follows. Referring to FIGS. 1 and 23 (for clarity, only a single sensor is shown in FIG. 23 as the general form and function of all sensors are the same), a shuttle-retract photo-electric sensor is located at 50, the emitter and receiver being positioned on opposite sides of the collar transfer device 100. This sensor supplies a 24 VDC input signal to the drill-rivet machine's PLC 600 when the collar transfer device 100 is fully retracted. This sensor is activated when the pneumatic shuttle actuator assembly 40 retracts the collar transfer device 100 to a position that causes the sensor's beam emitter to sight through a properly positioned rear shuttle aperture 150 formed through the shuttle, allowing the beam to be detected by the mating sensor beam receiver. A matching 24 VDC output status signal is then sent from the PLC 600 to the air-hydraulic manifold's 80 "shuttle retract" indicator lamp 82.

A shuttle extend/missing collar sensor is located at 52, the emitter and associated receiver being positioned on opposite sides of the shuttle 114 of the collar transfer device 100. This sensor supplies a 24 VDC input signal to the PLC 600 when the shuttle is fully extended out and over the ACFD's anvil cylinder assembly 300 and collar locator pin 370. This sensor is activated when the pneumatic shuttle actuator 40 extends the collar transfer device 100 to a position that causes the sensor's beam emitter to sight through the rear shuttle aperture 150, allowing its beam to be detected by its mating receiver. A matching 24 VDC output status signal is then sent from the PLC 600 to the air-hydraulic manifold's 80 "shuttle extend" indicator lamp 82. The shuttle extend/missing collar sensor is also detected when the collar transfer device 100 is fully retracted and no collar is positioned in the shuttle 114 so that the emitter's beam is detected by the receiver through the forward shuttle aperture 160 formed in the shuttle 114.

Prior art sensor systems relied on microswitches fixed to the shuttle actuator linkage to indicate shuttle retracted and shuttle extended status. Microswitches are prone to malfunctions because of the moving parts involved with the switches and the shuttle actuator linkage. Also, by monitoring only the actuator linkage, the switch is unable to detect a break between the actuator 40 and the collar transfer device 100.

The collar-stripped/anvil-down limit switch 255 supplies a 24 VDC input signal to the PLC 600 when the ACFD's anvil position is fully retracted in relation to the clamp housing 202. This switch is activated by the action of the pin 386 (found in the locator pin 370) striking the flange 253 of the linkage 250 cooperable with the switch 255 (see FIG. 3). A matching 24 VDC output status signal is then sent from the PLC 600 to the air-hydraulic manifold's 80 "collar stripped" indicator lamp 82.

It can be appreciated that the biased linkage-microswitch construction of the collar stripped/anvil-down switch 255 could be replaced by a properly positioned photo-electric sensor. The anvil's down status could be verified by the sensor's being detected through an aperture formed on a portion of the anvil piston assembly, such as apertures 384 or 380, formed through the locator pin 370.

The uninstalled collar ("second collar") photo-electric sensor is located at 26, the emitter and associated receiver being positioned on opposite sides of the anvil passage 213. This sensor supplies a 24 VDC input signal to the PLC 600 when the anvil cylinder assembly 300 has returned to the normal "tool rest" position. This sensor is activated by a properly positioned aperture 384 in the collar locator pin 370, causing the sensor's beam emitter to sight through the aperture 384 of the locator pin 370, allowing its beam to be detected by its mating sensor beam receiver. A matching 24 VDC output status signal is then sent from the PLC 600 to the "second collar" indicator lamp 82 of the air-hydraulic manifold 80. If an aborted cycle occurred any time after "anvil-up", then the "second collar" sensor beam would be blocked by an uninstalled collar on the locator pin 370, preventing further tool operation until that collar is removed.

An anvil-up/missing pin photo-electric sensor is located at 24, the emitter and associated detector being located on opposite sides of the anvil passage 213. This sensor supplies a 24 VDC input signal to the PLC 600 when sufficient hydraulic pressure in the anvil-up cylinder chamber causes the anvil piston 312 to rise to the "anvil-up" position, causing the normally detected sensor beam to be blocked. This sensor will then supply an input signal to the PLC 600 when a proper grip length lockbolt stump is inserted into a drilled hole, causing the collar locator pin 370 to be pushed down into the anvil piston 312 until a properly positioned sight hole 380 on the locator pin 370 is aligned with the sensor, permitting the emitter's beam to be detected by the receiver, allowing a collar swaging or "upset" cycle to occur. If the beam is not detected (indicating an incorrect grip length pin was inserted or no pin was inserted), then an "upset" cycle will not occur and the cycle must be aborted and corrected. When the beam is properly detected after pin insertion, then a matching 24 VDC output signal is sent from the PLC 600 to the "missing pin" indicator lamp 82 of the air-hydraulic manifold 80. Prior art systems relied on pressure transducers in the anvil cylinder to indicate anvil-up/down, which the present invention eliminates with the anvil-up/missing pin sensor.

D. One Cycle of the ACFD

With the above description of the structure and components which make up the sub-assemblies of the ACFD 20, the function and operation of the present invention is described below with reference to FIGS. 5–15, which illustrate 11 sequences, respectively, during one cycle of operation of the ACFD, and also with reference to FIG. 23.

Figure 5:
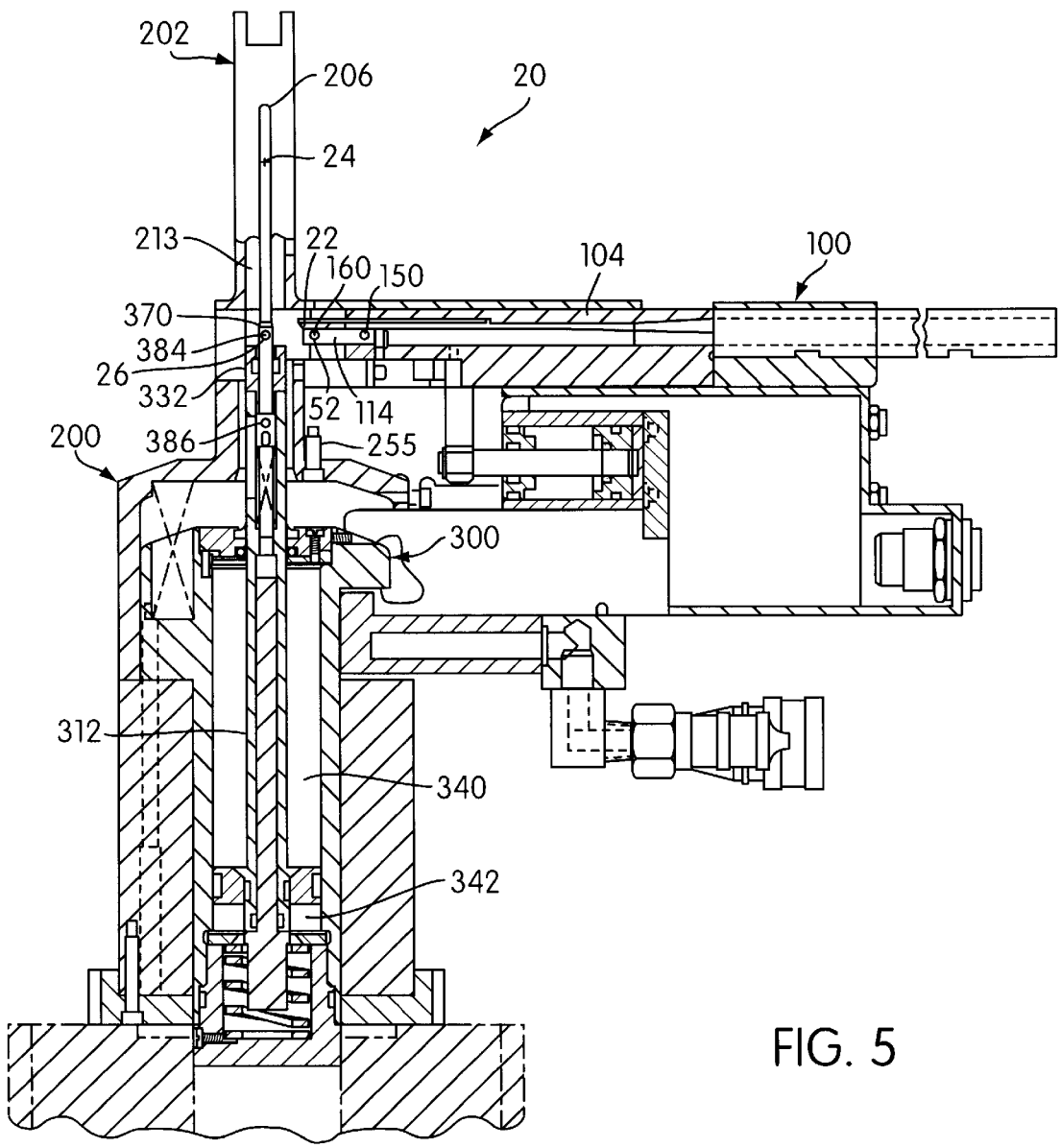
FIG. 5 is an elevational view, partially in cross-section, of the ACFD shown in a first sequence in a fastener-installing cycle.

FIG. 5 illustrates sequence 1, the home position, in which the device is ready to begin a cycle.

With the device in the home position, the collar transfer device 100 is fully retracted in a fastener element receiving position and a collar 22, which has been provided by a remote sending unit, is located in the shuttle 114. The anvil piston 312 is in a down position with the top of the locator pin 370 extending above the anvil 332. If this were the beginning of a first cycle, the shuttle would be "loaded" with the first collar by pressing a collar send button on a sending unit control box. If this were a continuation of previous cycles, the PLC would automatically instruct the sending unit to send the collar.

With the device in this condition, a missing pin sensor, comprising an emitter and an associated receiver and located at position 24 is detected, there being no structure between the emitter and the receiver. Likewise, the uninstalled collar sensor, comprising an emitter and an associated receiver and located at position 26, is detected as the upper aperture 384 of the locator pin 370 is aligned with the emitter and receiver, thereby verifying the absence of an uninstalled collar on the locator pin 370. The emitter beam of the shuttle extend/missing collar sensor 52 is blocked as the forward shuttle aperture 160 is blocked by the collar 22 located in the shuttle 114, thus verifying the presence of the collar 22 properly located in the shuttle 114. The emitter beam of the shuttle retract sensor 50 is detected as the rear shuttle aperture 150 is aligned with the emitter and receiver of the shuttle retract sensor 50. This verifies that the collar transfer device 100 is fully retracted. With the above condition verified by the sensors 24, 26, 50, 52, and switch 255 whose signals are sent to the PLC 600, the ACFD is ready to proceed to the next sequence illustrated in FIG. 6.

As shown in FIG. 23, the PLC 600 is in communication with the air-hydraulic manifold 80 which in turn is in communication with the ACFD via hydraulic lines to control anvil up and down movement (generally indicated at box 602). Switches and solenoids for controlling the flow of hydraulic fluid between the manifold 80 and the anvil-up/down devices 602 are located in the manifold 80 and controlled by signals from the PLC 600.

In the second sequence of the cycle, the PLC 600, having received the proper signals from sensors 24, 26, 50, 52 and switch 255, sends an anvil-down control signal to the air-hydraulic manifold 80. The anvil-down hydraulic connection 28 is pressurized so as to pressurize the anvil-down chamber 340 and the anvil-up hydraulic connector 30 is open to tank so that any fluid in the anvil-up chamber 342 can escape to the tank. With the anvil-down chamber 340 pressurized, the anvil piston head 336 is forced downwardly within the anvil cylinder 302 until it comes into contact with the stop washer 358. The spring rod 346 is moved down with the anvil piston 312 and the flange 354 of the spring rod is unseated from the beveled seat 360 of the stop washer 358. The flange 354 of the spring rod 346 forces the die spring 362 downwardly into a compressed position.

With the anvil piston 312 moved downwardly, the top of the locator pin 370 is now below the shuttle 114 and the clamp assembly 200 and the anvil cylinder assembly 300 are in a collar-receiving configuration. In addition, the pin 386 extending through the locator pin 370 is now at its lowest position and engages linkage 250 (not shown in FIG. 6) to pivot the linkage and allow switch 255 to pop up, thus verifying that the locator pin 370 is below the shuttle 114.

With the device in this position, the missing pin sensor beam located at 24 continues to be detected as there is no structure between the emitter and the receiver. The beam of the uninstalled collar sensor 26 remains detected as there is no structure between the emitter and the receiver. The beam of the shuttle extend/missing collar sensor 52 remains blocked by the collar 22 disposed within the shuttle 114 thus blocking the forward shuttle aperture 160. The shuttle retract sensor 50 continues to be detected as the rear shuttle aperture 150 is aligned with the emitter and the receiver. With the four sensors in the above-described state and with the toggle switch 255 on, verifying that the locator pin 370 is below the shuttle 114, the proper signals are sent to the PLC 600 to move the ACFD 20 to the next sequence in the cycle.

Figure 6:
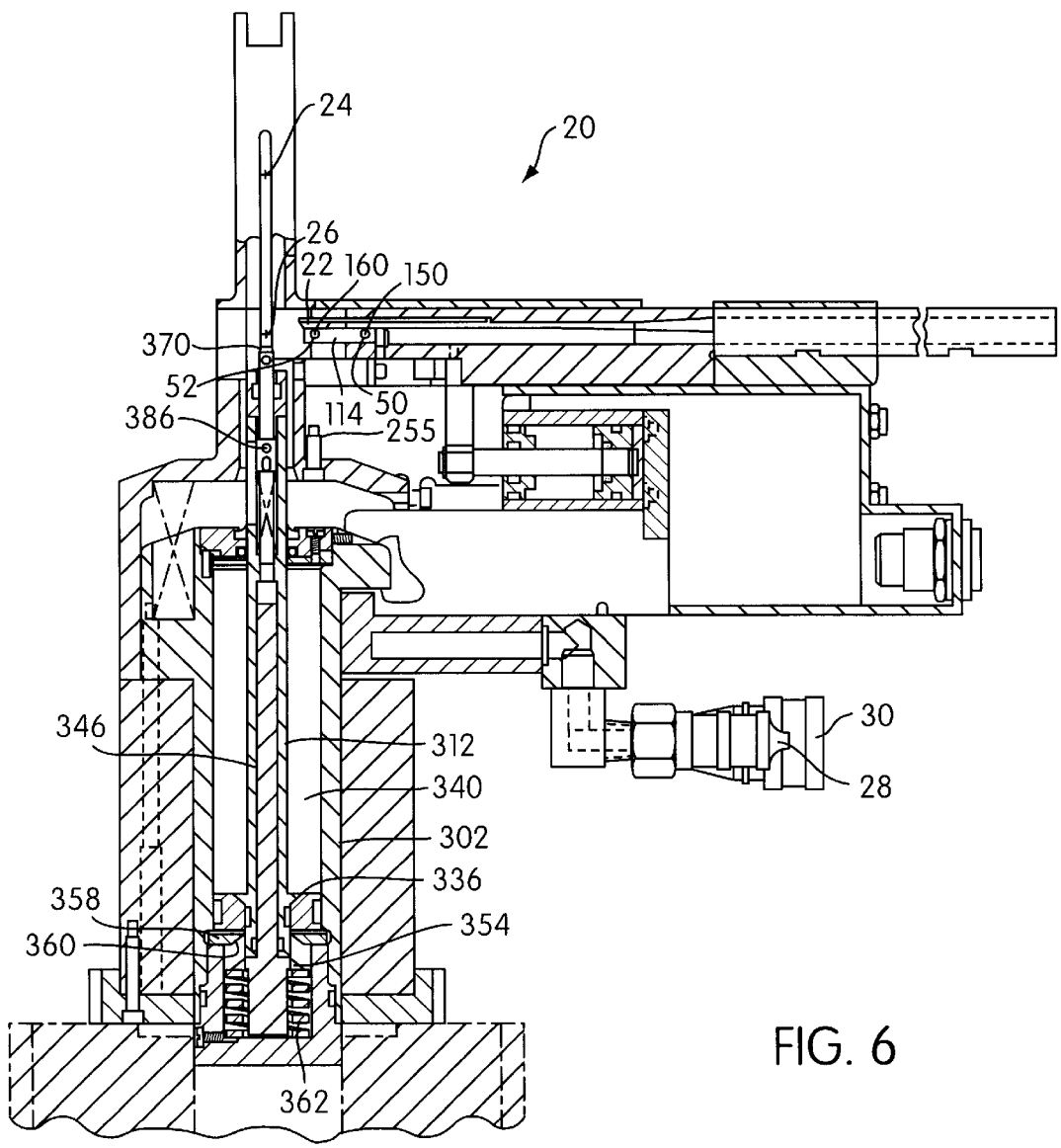
FIG. 6 is an elevational view, partially in cross-section, of the ACFD shown in a second sequence in the fastener-installing cycle.
Figure 7:
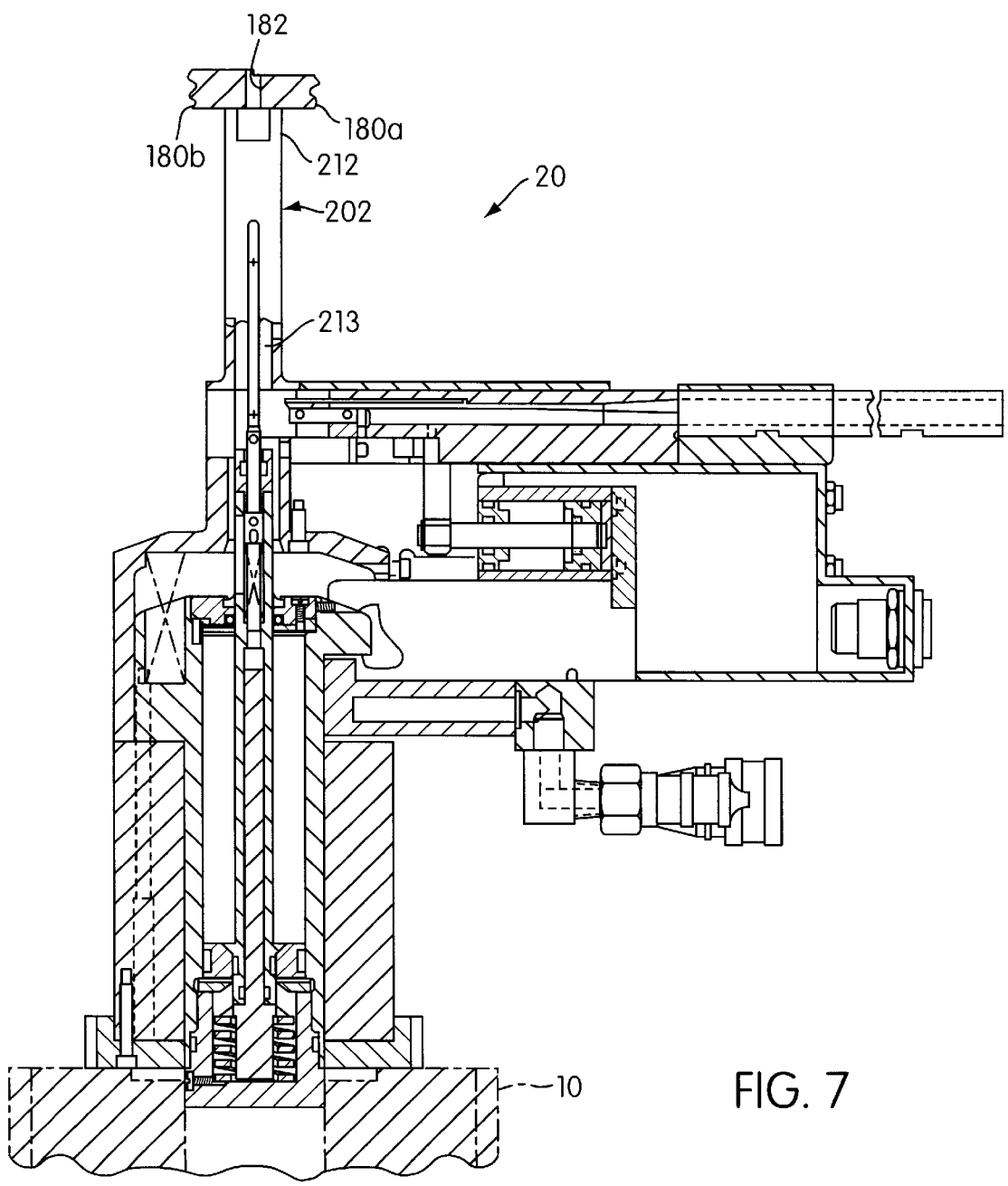
FIG. 7 is an elevational view, partially in cross-section, of the ACFD shown in a third sequence in the fastener-installing cycle.

With the status of the device verified in sequence 2 as shown in FIG. 6, the device is now ready to be engaged with a work piece as shown in FIG. 7. The ACFD 20 is brought into contact with a work piece represented by Reference Nos. 180*a* and 180*b*. Reference Nos. 180*a* and 180*b* represent, respectively, work pieces of varying thicknesses, each of which the present invention is adapted to accommodate. The ACFD 20 is raised by the drill-rivet machine until the upper portion 212 of the clamp housing 202 comes into contact with the work piece 180*a*, 180*b*. Clamp limit switches and clamp safety limit switches, which limit the movement of the ACFD 20 by regulating the pressure with which the housing 202 is pressed against the work piece 180a, 180b, as used in conventional drill-rivet machines, are preferably employed to regulate ACFD movement and clamping pressure.

When the PLC 600 receives the signal indicating that the work piece is clamped, the drill 600 (see FIG. 23) of the drill/rivet machine approaches the work piece at a position opposite the ACFD 20 and generally coaxial with the upper portion 212 of the housing 202. With the drilling device in place and approaching the work piece, an external vacuum collection system (not shown) is activated by the PLC for collecting debris created by any preceding drilling processes. The drilling device then drills hole 182 through the work piece 180a, 180b. The internal vacuum assembly 240 (see FIG. 1), which is in communication with the anvil passage 213 of the upper portion of the housing 212 collects debris during drill breakthrough.

With the hole 182 formed, the drill is retracted by the drilling device and the vacuum collection systems are shut down.

It will be appreciated that during Sequence No. 3, as illustrated in FIG. 7, none of the internal components of the ACFD 20 have moved from their positions of Sequence No. 2. Accordingly, the status indicator sensors and the collar strip switch remain as they were in Sequence No. 2 shown in FIG. 6 and described above. The ACFD 20 is ready to proceed onto Sequence No. 4 of the cycle.

Figure 8:
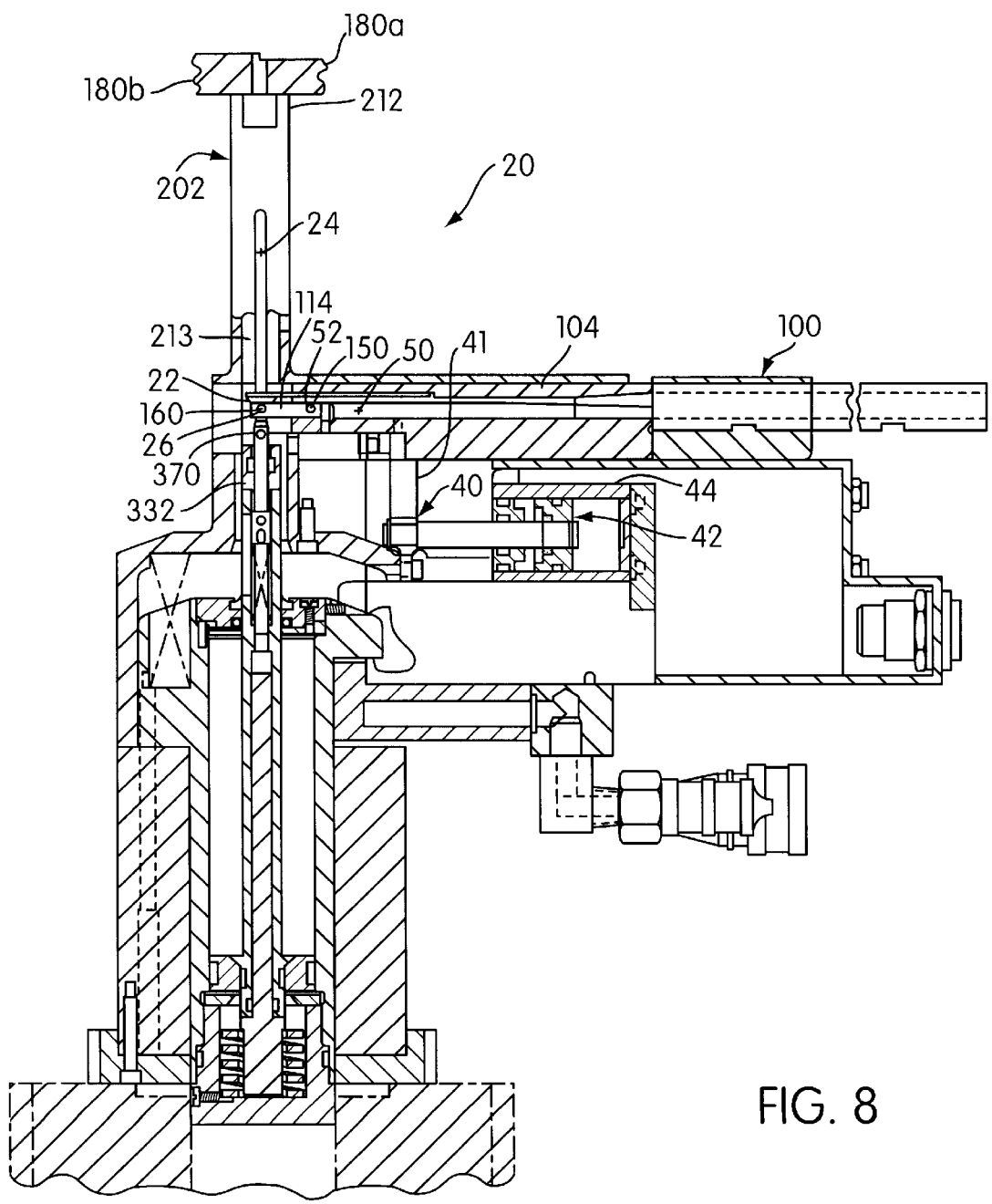
FIG. 8 is an elevational view, partially in cross-section, of the ACFD shown in a fourth sequence in the fastener-installing cycle.

In Sequence No. 4, as illustrated in FIG. 8, the drill 602 has been moved up and away from the work piece 180a, 180b and the PLC 600 sends a control signal to the manifold 80 (see FIG. 23) to extend collar transfer device 100 to move the shuttle 114 and the collar 22 held thereby into the anvil passage 213 of the upper portion 212 of the clamp housing 202 to a collar transfer position.

The collar transfer device 100 is preferably extended by means of a pneumatically driven shuttle slide actuator assembly 40. The actuator system 40 comprises a pneumatic piston 42 housed within a cylinder 44 and a linkage 41 extending from the cylinder 42 to the collar track member 104 of the collar transfer device 100. The cylinder 44 is pressurized through the manifold 80 to extend the piston 42 to the left, as shown in FIG. 8, to move the collar transfer device 100 also to the left and move the collar 22 into the anvil passage 213.

With the collar transfer device 100 extended, the missing pin sensor located at 24 remains unblocked so that the emitter beam is detected by the receiver. The second collar sensor located at 26 is now blocked by the collar 22 which is blocking the forward shuttle aperture 160 in the shuttle 114. The shuttle extend/missing collar sensor 52 is detected as the rear shuttle aperture 150 is now aligned with the emitter and receiver of the shuttle extend/missing collar sensor 52. Alignment of the rear shuttle aperture 150 with the shuttle extend/missing collar sensor 52 verifies that the shuttle is fully extended. The shuttle retract sensor located at 50 is now blocked by the collar track member 104. The blockage of the second collar sensor at 26 combined with the detection of the shuttle extend/missing collar sensor 52 verifies that a collar 22 is located in the extended shuttle 114. In this regard, it is important that the distance between the forward shuttle aperture 160 and the rear shuttle aperture 150 be equal to the distance that the collar transfer device 100 moves forward when positioning a collar into the anvil passage 213. In addition, it is important that there be two apertures 160 and 150 in the collar transfer device to verify both that a collar is centered above the locator pin 370 and anvil 332 and also that the transfer device 100 is fully extended. The collar 22 is now centered above the locator pin 370 and the anvil 332, and sensor signals to the PLC indicate that the ACFD 20 is now ready to move to the next sequence in the cycle.

Figure 9:
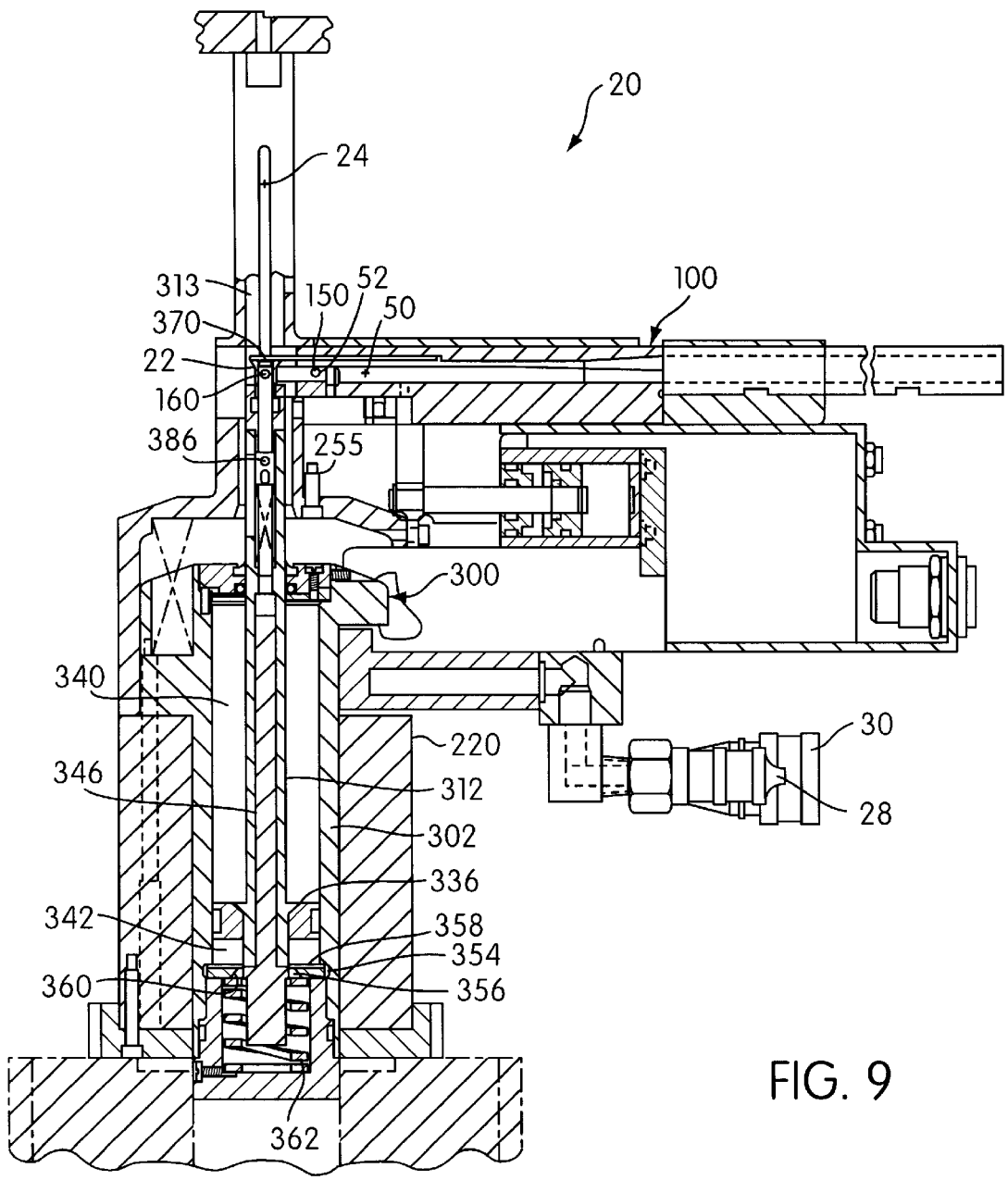
FIG. 9 is an elevational view, partially in cross-section, of the ACFD shown in a fifth sequence in the fastener-installing cycle.

In Sequence No. 5, the PLC 600 sends the proper control signals to the air-hydraulic manifold 80 to open both hydraulic connections 28 and 30 to the tank, thus depressurizing the anvil-down chamber 340 of the anvil cylinder 302. As shown in FIG. 9, with chamber 340 depressurized, spring 362 is now permitted to expanded until the beveled flanged 354 of the spring pin 346 engages the beveled seat 360 of the stop washer 358. The upward movement of the spring 362 and spring pin 346 causes a corresponding upward movement of the anvil piston 312 and the locator pin 370 so that the locator pin 370 extends through and captures the collar 22. The clamp assembly 200 and the anvil cylinder assembly 300 are now in a collar capture configuration. This is essentially the same status as the home position of sequence 1 shown in FIG. 5 with the exception that the collar transfer device 100 is extended into the anvil passage 313.

In this position, the missing pin sensor 24 remains detected, the uninstalled collar sensor at 26 remains blocked by the collar 22, the shuttle extend/missing collar sensor 52 remains detected through the rear shuttle aperture 150, and the shuttle retract sensor 50 remains blocked. With the anvil piston 312 and the locator pin 370 moving upwardly, switch 255 is no longer engaged by the pin 386. Thus, the collar strip/anvil-down switch is off.

It should be noted that the upward movement of the anvil piston 312 upon depressurization of the anvil-down chamber 340 can be tailored to accommodate collars of varying thicknesses. This is accomplished by varying the position of the stop washer 358 by installing a different anvil cylinder 302, having an annular shoulder 356 located at a different position, into the spacer member 220 of the clamp assembly 200.

With the locator pin now extending through the collar 22, and the switch 250 now off, sensor signals to the PLC 600 indicate that the ACFD is ready to proceed to the next sequence in the cycle.

As shown in FIG. 23, the PLC 600 is in communication with the manifold 80 which is in communication via pneumatic lines with the shuttle actuator 40. Switches and solenoids for controlling air flow between the manifold 80 and the shuttle actuator 40 are located in the manifold 80 and controlled by signals from the PLC 600.

Figure 10:
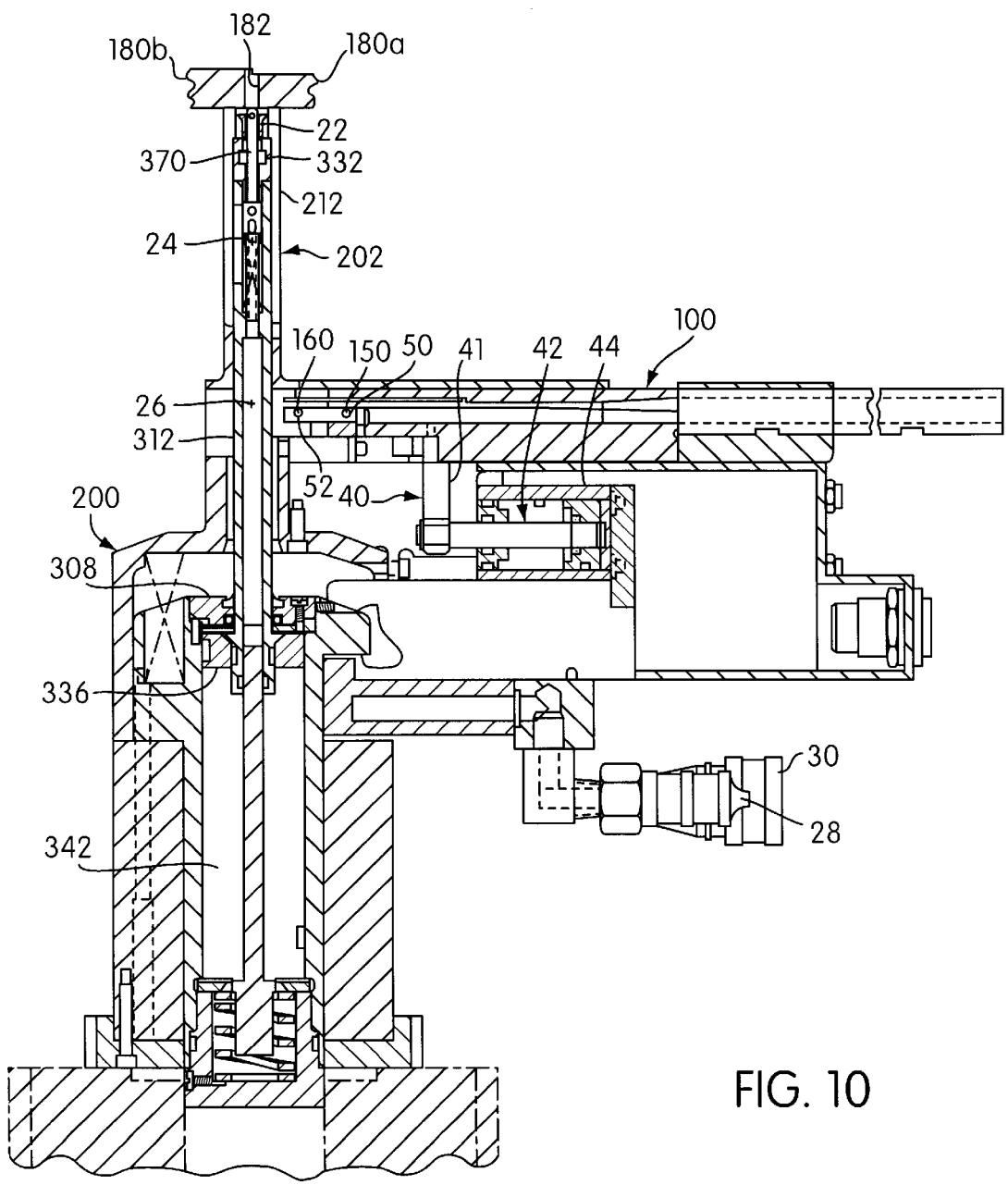
FIG. 10 is an elevational view, partially in cross-section, of the ACFD shown in a sixth sequence in the fastener-installing cycle.

In Sequence 6 as illustrated in FIG. 10, the PLC 600 commands the ACFD 20 to perform two functions. First, the PLC 600 sends a control signal to the manifold 80 to pressurize cylinder 44 of the shuttle actuator 40 to move the shuttle actuator piston 42 to the right as shown in FIG. 10 to retract the collar transfer device 100 a corresponding amount. When the collar transfer device 100 is retracted, the collar 22 remains on the locator pin 370, the shuttle spring arms 116 of the shuttle 114 spreading elastically to permit the collar 22 to pass between the inwardly bent portions 138. (see FIGS. 2A and 2B and corresponding description above). With the collar transfer device 100 fully retracted, the shuttle extend/missing collar sensor 52 is detected through forward shuttle aperture 160 because the collar 22 has been removed from the shuttle 114, and the shuttle retract sensor 50 is detected through rear shuttle aperture 150, verifying that the collar transfer device 100 is retracted.

With verification that the collar transfer device 100 is fully retracted and that the collar has been removed from the shuttle 114, the PLC 600 sends a control signal to the manifold 80 to cut off pressure to the shuttle actuator 40 and now begins to pressurize the anvil-up hydraulic line 30 while anvil-down hydraulic line 28 is open to tank. Accordingly, the anvil-up chamber 342 is pressurized, thus raising the anvil piston head 336 and the anvil piston 312 until the anvil piston head 336 contacts the upper piston stop 308. The distance traveled by the anvil piston head 336 until it contacts the upper piston stop 308 is designed so that when the piston head 336 contacts the upper piston stop 308, the collar 22 supported on the anvil 332 and centered on the locating pin 370 is at or near the hole 204 at the top of the upper portion 212 of the clamp housing 202. In addition, when the anvil piston reaches the top of its stroke, the oil pressure in the anvil-up chamber 342 is increased by the PLC to the system operating pressure. In this condition, the missing pin sensor at 24 is now blocked by the locator pin 370 and the uninstalled collar sensor at 26 is blocked by the anvil piston 312. In addition, as previously stated, the shuttle extend/missing collar sensor 52 is detected through forward shuttle aperture 160 and the shuttle retract sensor 50 is detected through rear shuttle aperture 150.

With the collar transfer device 100 retracted and the anvil piston 312 topped out, the clamp assembly 200 and the anvil cylinder assembly 300 are in the collar installing configuration, and signals sent to the PLC 600 indicate that the ACFD 20 is ready to proceed to the next sequence.

Figure 11:
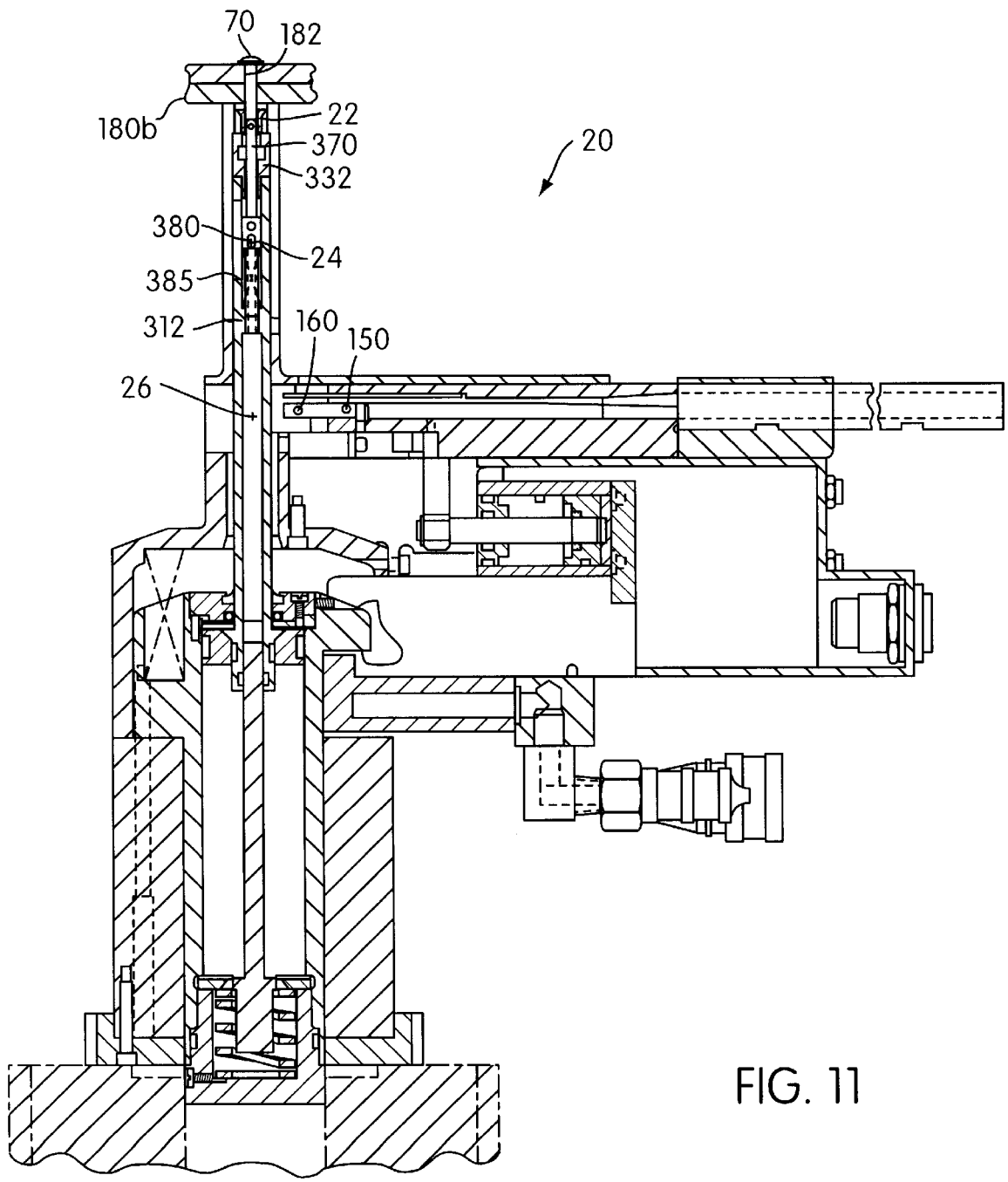
FIG. 11 is an elevational view, partially in cross-section, of the ACFD shown in a seventh sequence in the fastener-installing cycle.
Figure 11A:
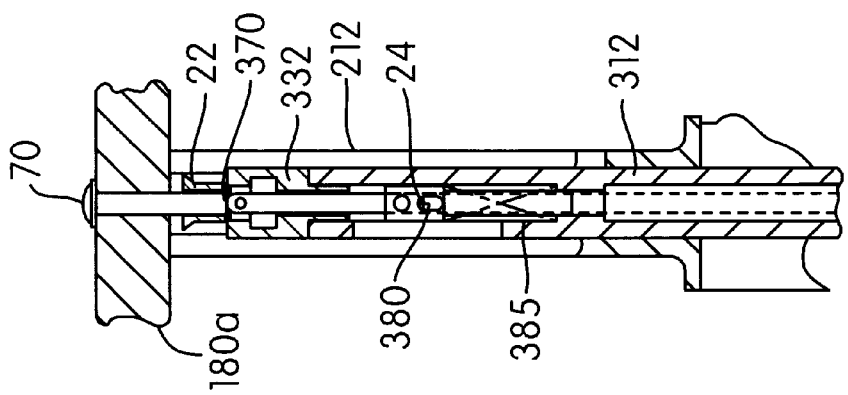
FIG. 11A is a partial elevation in cross-section of the ACFD shown in the seventh sequence in the fastener-installing cycle with a work piece thickness less than the work piece thickness shown in FIG. 11.

In Sequence No. 7, shown in FIG. 11, the PLC 600 instructs a lock bolt installer 608 (see FIG. 23) to insert a fastener pin 70 through the hole 182 formed in the work piece 180a (180b). As shown in FIG. 11, the fastener 70 preferably extends through the hole 182 and into the collar 22. The fastener pin 70 extending through the hole 182 comes into contact with the locator pin 370, thus pushing the locator pin 370 downwardly against the resistance of the spring 385. That a pin 70 of proper length has been inserted is verified by the missing pin sensor beam located at 24. The sensor beam is detected through the lower aperture 380 when the locator pin 370 is moved downwardly by the pin 70 so that the lower aperture 380 moves into alignment with the missing pin sensor 24. As shown in FIG. 11A, if thinner work material 180a is used (or, similarly, a longer fastener pin is used) a greater portion of the fastener pin extends into the collar 22, thus moving the locator pin 370 against the force of the spring 385 a further distance. The varying thicknesses of the work material or the varying lengths of the pins may be accounted for by the elliptical shape of the lower aperture 380 formed in the locator pin 370. That is, if pin 370 is moved downwardly within a range defined by the length of aperture 380 so that sensor 24 is aligned with some portion of aperture 380, sensor 24 will be detached. If however, too short a pin, too long a pin, or no pin at all is inserted, the locator pin 370 is either not moved enough or is moved too far to align the missing pin aperture 380 with the missing pin sensor 24. In any case, the proper signal, is not sent to the PLC and the procedure is aborted. As can be appreciated from FIG. 4B, the slot 320 formed in the anvil piston 312 permits the beam of the missing pin sensor 24 to pass through missing pin aperture 380 when properly aligned therewith.

The fastener pin 70 is preferably mechanically installed by the drill/rivet machine and a conventional "buck down" limit switch confirms that the head of the fastener pin is properly seated on the work piece. With the head of the pin 70 properly seated and the missing pin sensor 24 detected, indicating that a fastener pin of proper length has been inserted, signals sent to the PLC 600 indicate that the ACFD 20 is now able to proceed to the next sequence.

Figure 12A:
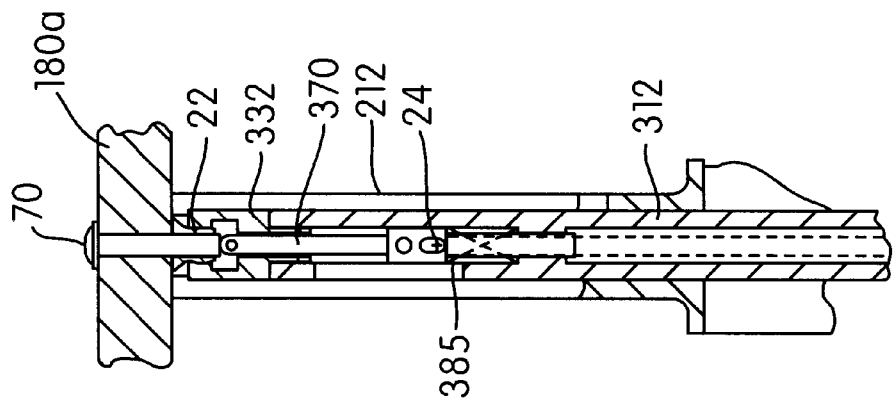
FIG. 12A is a partial elevation in cross-section of the ACFD shown in the eighth sequence in the fastener-installing cycle with a work piece thickness less than the work piece thickness shown in FIG. 12.
Figure 12:
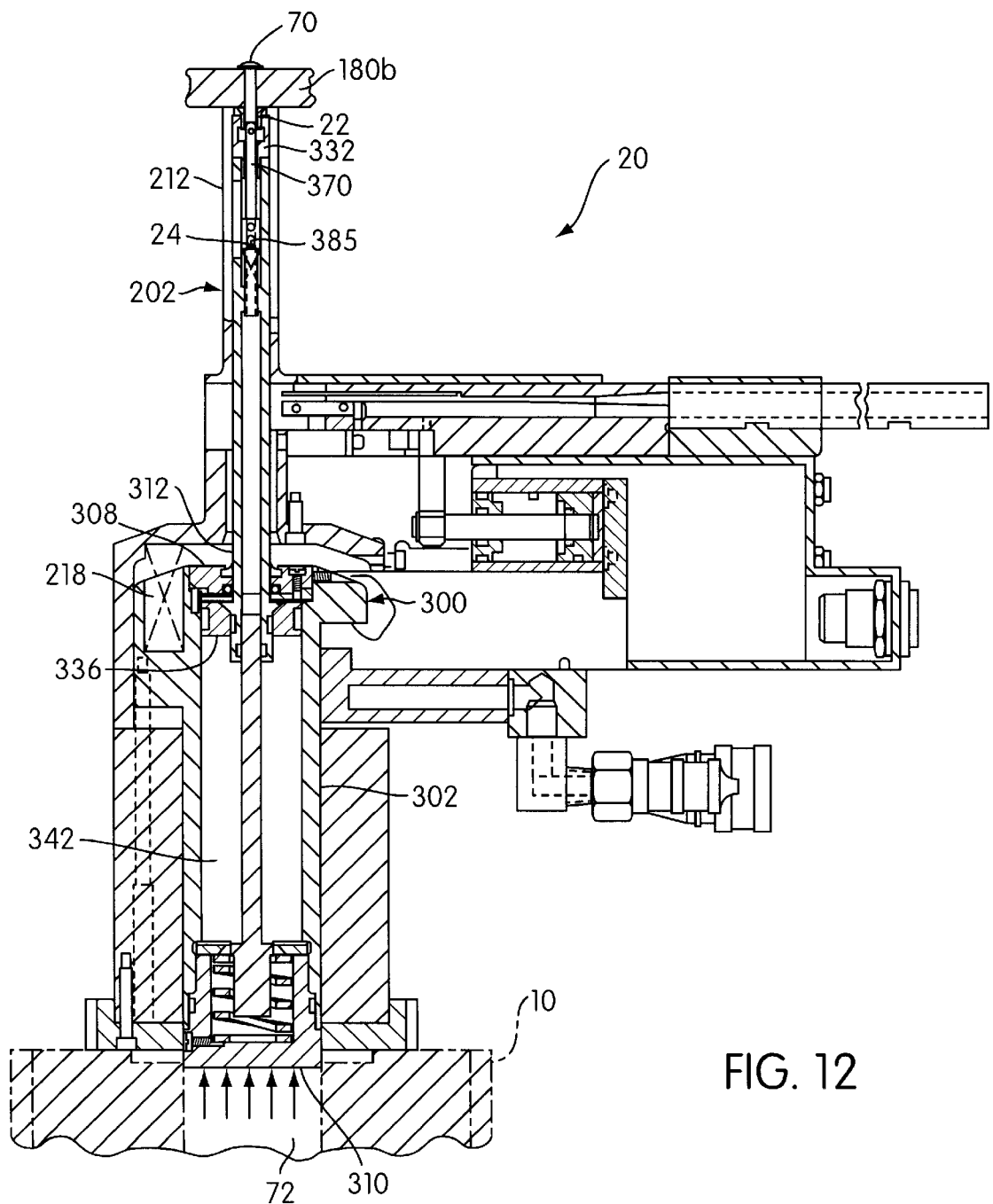
FIG. 12 is an elevational view, partially in cross-section, of the ACFD shown in an eighth sequence in the fastener-installing cycle.

In Sequence No. 8 shown in FIGS. 12 and 12A, in response to a command from the PLC 600, the entire anvil cylinder assembly is forced upward by a lower ram 72 (see also FIG. 23) of the drill-rivet machine pushing on the bottom of end cap 310. Thus, the anvil cylinder 302 is forced upwardly, compressing springs 218, and the blocked hydraulic fluid in the anvil-up chamber 342 pushes the anvil piston head 336 and the anvil piston 312 up as well.

The anvil cylinder assembly 300 is forced up until the anvil 332 radially overengages the collar 22 so as to swage the collar onto the fastener pin 70 in a manner known in the art. The upset force generated by the piston 72 and the duration of the force are preferably controlled by a Huck Automatic Pressure Limit Control System (A.P.L.C.S.), Part No. 115215.

While the anvil cylinder assembly 300 is moved generally upwardly during the collar swaging process, the locator pin 370 is prevented from moving further upwardly by the contact of its end with the end of the fastener pin 70. Accordingly, spring 385 is compressed even further. As the pin 370 remains stationary during the swaging process, missing pin sensor 24 remains detected through the lower aperture 380.

Figure 13:
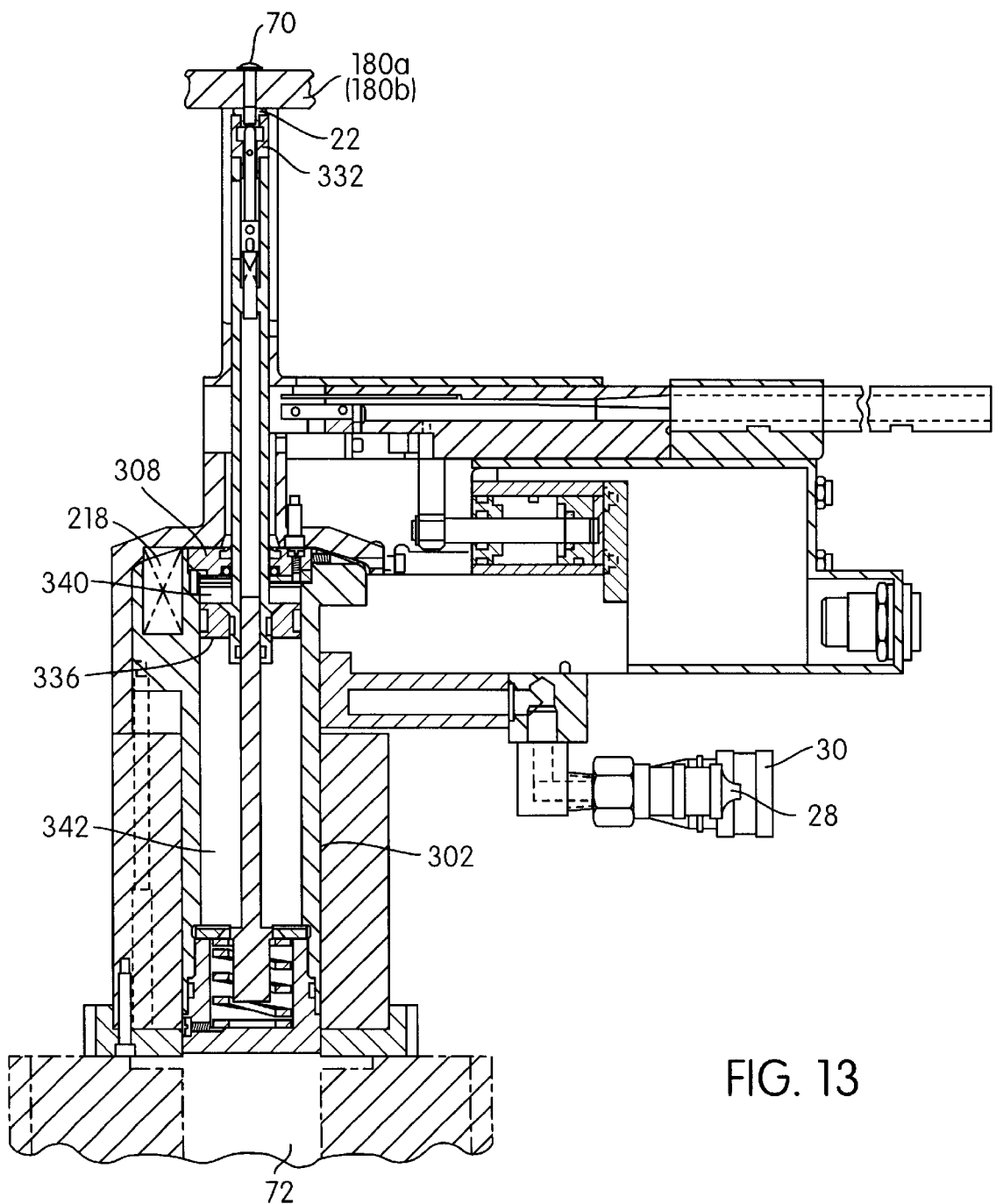
FIG. 13 is an elevational view, partially in cross-section, of the ACFD shown in a ninth sequence in the fastener-installing cycle.

Following the swaging process, the PLC 600 commands the ACFD 20 to move on to Sequence No. 9 as shown in FIG. 13.

In Sequence No. 9, ejection of the swaged collar 22 from the anvil 332 is commenced. Following full anvil/collar overlap, the lower ram 72 of the drill/rivet machine is depressurized in response to a command from the PLC 600. Springs 218, being compressed, will tend to urge the anvil cylinder 302 downwardly, but this downward movement is resisted by the frictional force holding the anvil 332 to the collar 22 when the upper piston stop 308 contacts the anvil piston head 336. At this point, the PLC 600 will command the air-hydraulic manifold 80 to pressurize the anvil-down hydraulic line 28 and to open the anvil up hydraulic line 30 to tank. Preferably, the bottom surface of upper piston stop 308 is fluted so that when its lower surface is in contact with the upper surface of the piston head 336, hydraulic oil may still be forced between the piston stop 308 and piston head 336. As pressure in the anvil-down line 28 comes up, the anvil-down chamber 340 is pressurized so as to pull the anvil 332 off of the swaged collar 22. The sensors remain unchanged during Sequence No. 9 until the anvil 332 is actually pulled off the collar 22.

Figure 14:
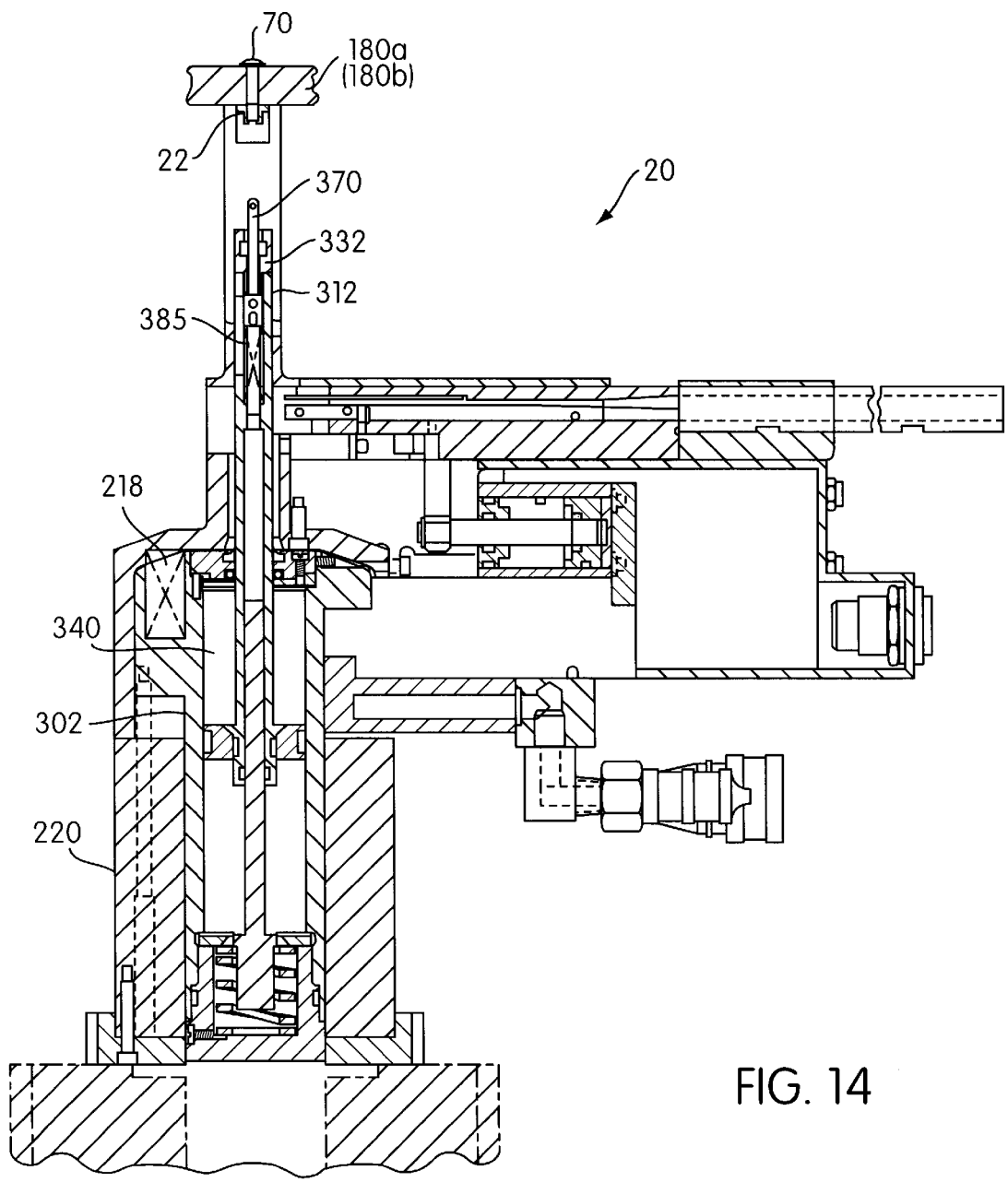
FIG. 14 is an elevational view, partially in cross-section, of the ACFD shown in a tenth sequence in the fastener-installing cycle.

Next, as shown in FIG. 14, during Sequence No. 10, as anvil cylinder 312 is forced down by pressurization of the anvil-down chamber 340, the anvil 332 is removed from the collar 22. After the anvil 332 is removed from the collar 22 springs 218 are permitted to expand, thus urging the anvil cylinder 302 down toward the spacer member 220. In addition, as the anvil piston 312 continues to retract, the locator pin spring 385 is permitted to again expand, thus extending the locator pin 370 above the anvil 332.

Figure 15:
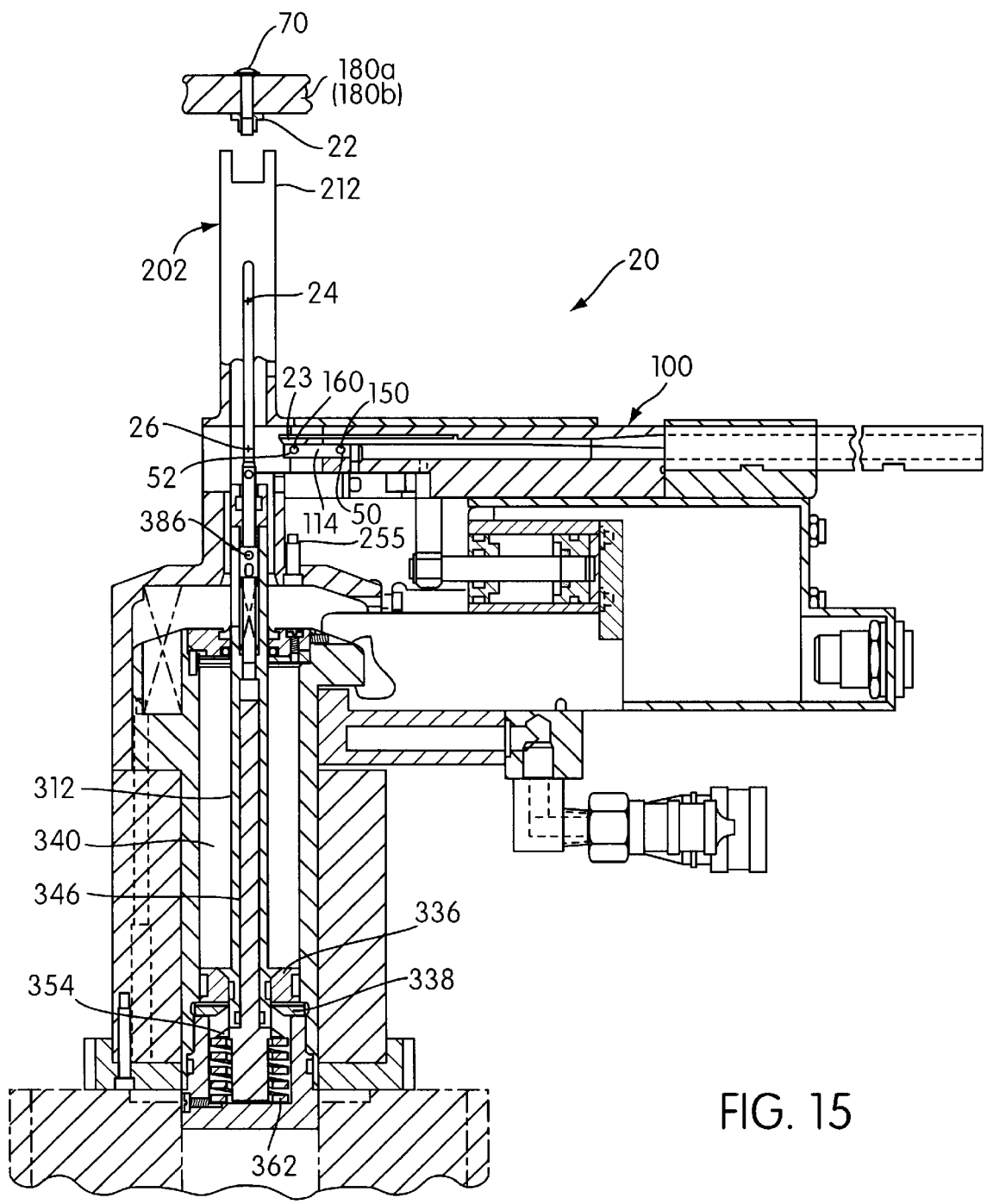
FIG. 15 is an elevational view, partially in cross-section, of the ACFD shown in an eleventh sequence in the fastener-installing cycle.
Figure 16:
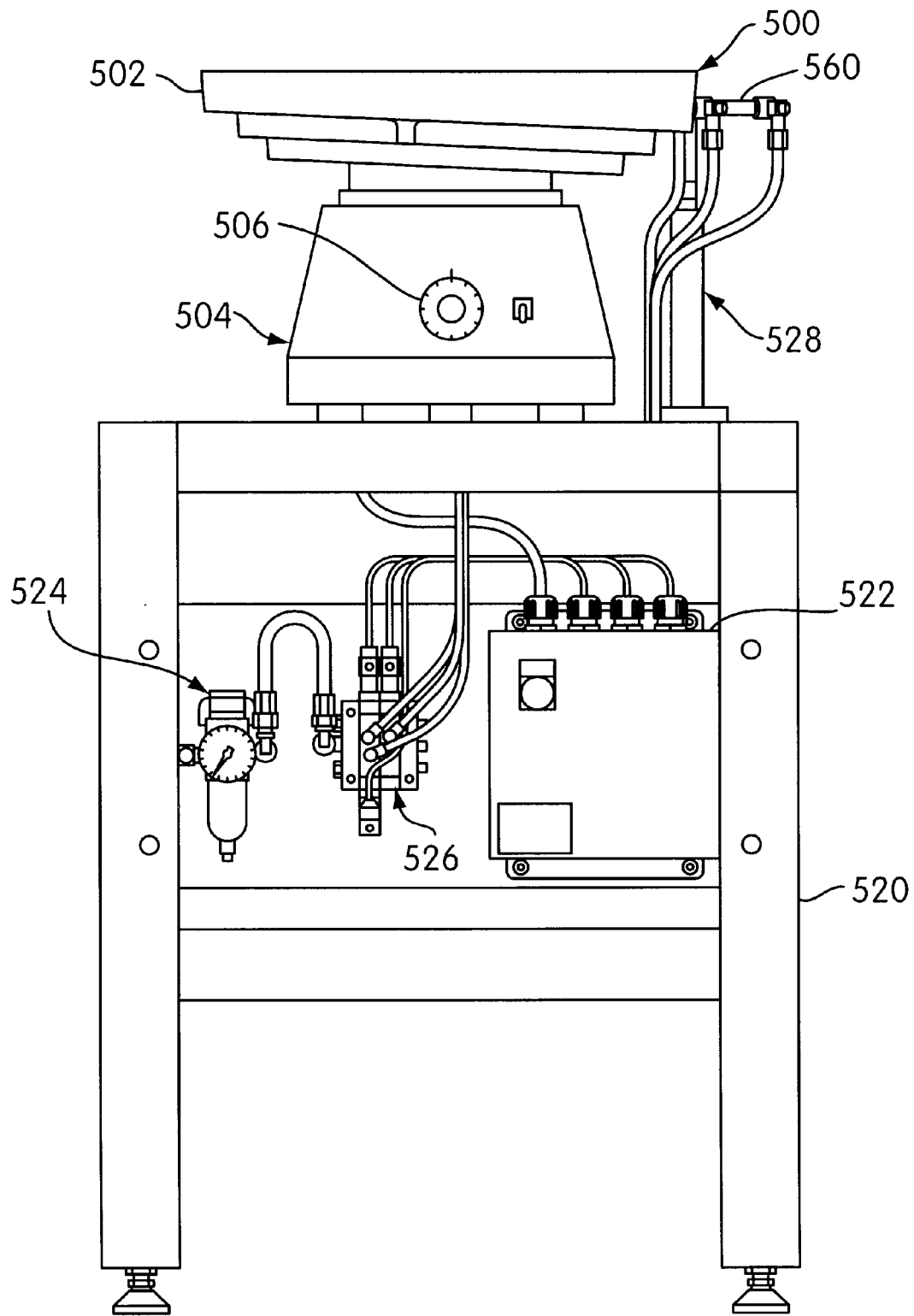
FIG. 16 is a side elevation of a collar sorting/sending unit incorporating aspects of the present invention with the sorting/sending unit supported on a table.
Figure 17:
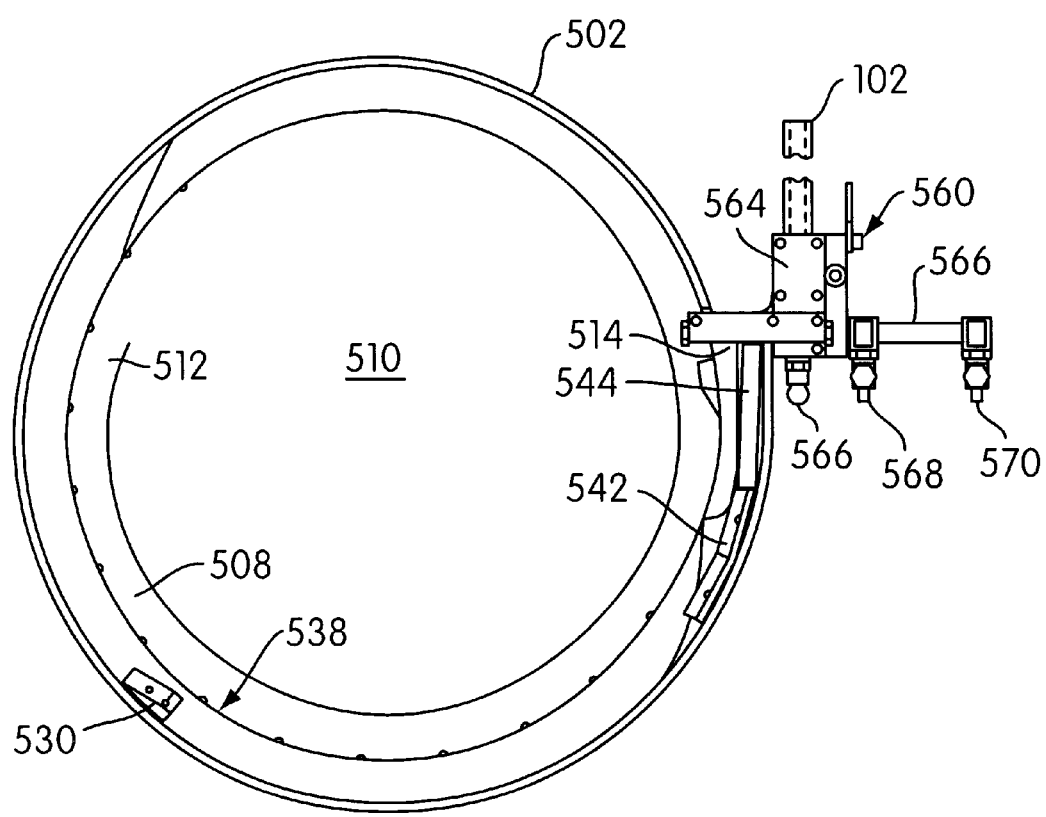
FIG. 17 is a top view of a sorting bowl and collar sending unit of the collar sorting/sending unit according to the present invention.

In the final Sequence No. 11 shown in FIG. 15, it can be seen that as the anvil-down chamber 340 continues to be pressurized, the anvil piston 312 continues its downward movement until the piston head 336 contacts the stop washer 338, thus forcing flange 354 of the spring pin 346 downwardly to compress the die spring 362. At this point, the anvil piston 312 is at its lowest position and the locating pin dowel 386 engages the collar strip toggle linkage 250 to trip microswitch 255 indicating that the cycle is finished.

The drill-rivet machine lowers the ACFD 20 from the work piece. If all has gone properly in the previous cycle and the machine is ready to begin a new cycle, the missing pin sensor 24 will be detected (i.e., unblocked), the uninstalled collar sensor 26 will be detected (unblocked) and the shuttle retract sensor 50 will be detected (unblocked) through the rear shuttle aperture 150.

With the proper signals from the sensors, the PLC 600 will command the sending unit 500 (see FIG. 23) to discharge a new collar 23 which comes to rest in the shuttle 114, thus blocking the shuttle extend/missing collar sensor 52 by blocking the forward shuttle aperture 160. At this point, the device is positioned as it was previously shown in FIG. 6, Sequence No. 2, and is now ready to begin a new cycle.

E. Collar Sorting/Sending Unit

The collar sorting/sending unit as well as details of a preferred bowl structure and various modifications made thereto to assist in the collar sorting process are shown in FIGS. 16, 17, 18, 18A, and 18B. A collar sorting/sending unit 500 includes a vibrating base 504 controlled by a vibrating base control knob 506 and a sorting bowl 502. The sorting/sending unit 500 is mounted on a table 520. The table 520 may also have mounted thereon various components such as control box 522, regulator 524, and various other components such as pneumatic tubes, valves and connectors generally indicated by number 526.

Bowl 502 includes a bottom section 510 and a helical ramp 508 extending around the periphery of the bowl from a starting point 512 to a termination point 514. In a manner known in the art, a supply of collars placed in the bowl 502 will be caused to "walk up" the helical ramp 508 by vibration of the bowl caused by the vibrating unit 504.

A collar sending unit 560 is mounted proximate the terminating point 514 of the helical ramp 508. The sending unit 560 is constructed and arranged to receive one collar at a time from the bowl 502 and send one collar at a time upon command through the collar transfer tube 102 toward the collar transfer device 100 (see e.g., FIG. 1).

The collar sending unit 560 is preferably mounted on a mounting post 528 extending up from the table 520 so as to isolate the collar sending unit 560 from the vibrations of the bowl 502 and vibrating unit 504, as much as possible.

Suitable sorting bowls and vibrating bases include those manufactured by Automation Devices, Inc.

Figure 18:
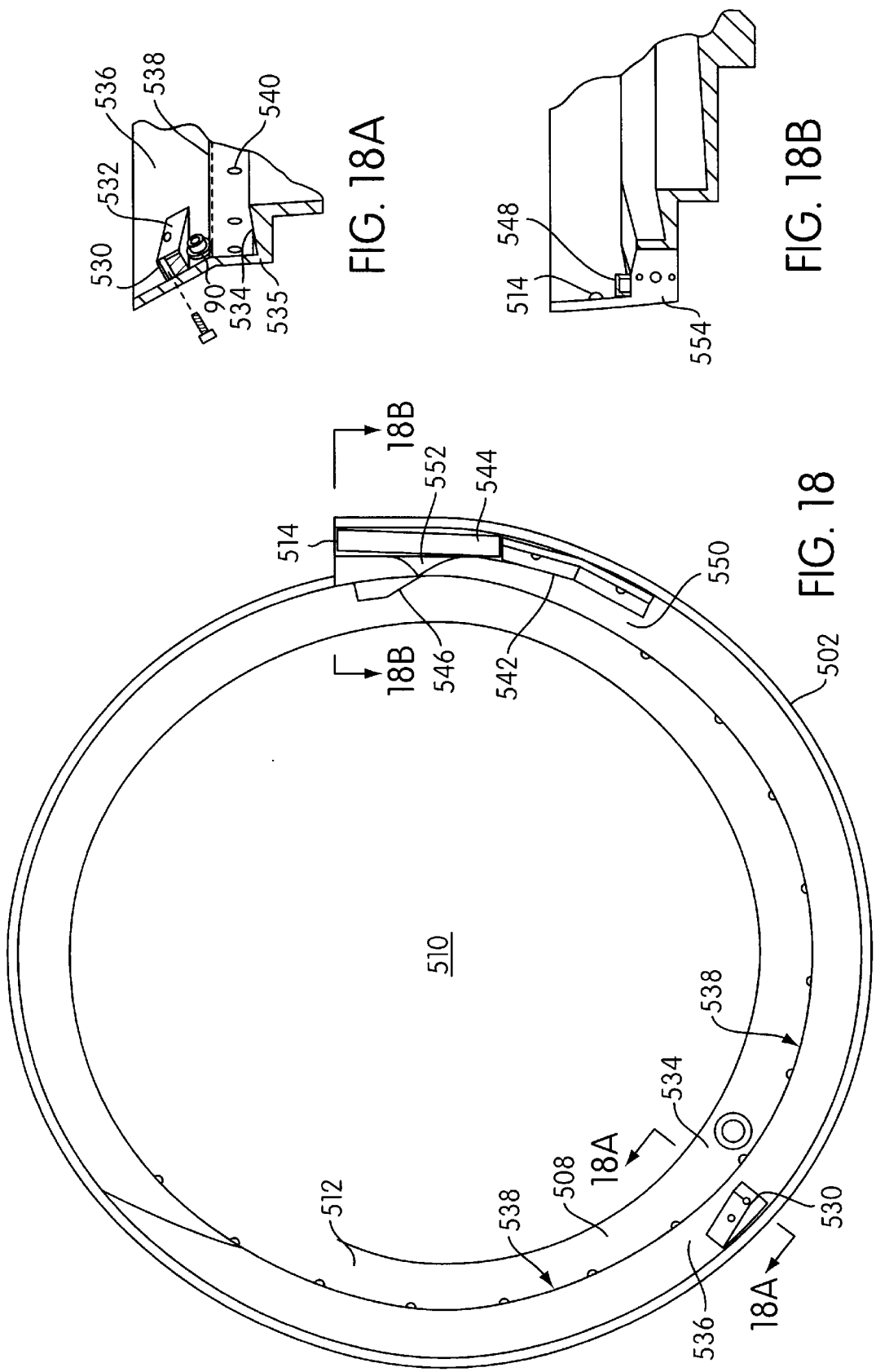
FIG. 18 is a top view of the sorting bowl of the collar sorting/sending unit according to the present invention.
Figure 19:
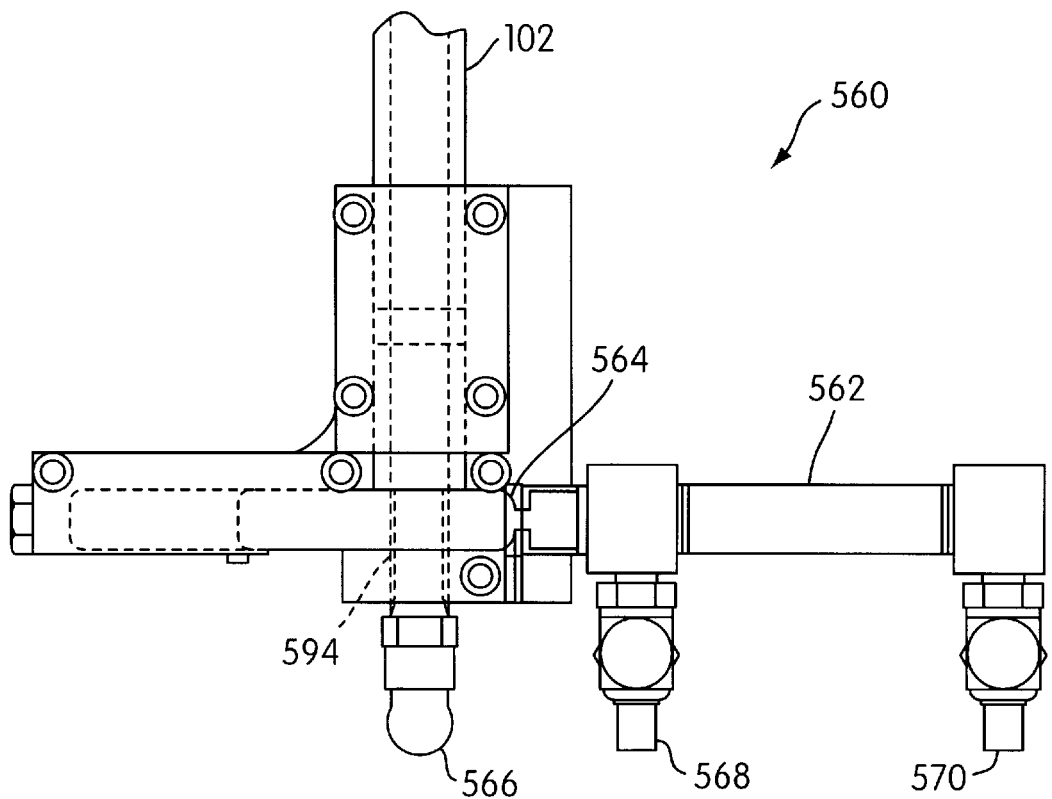
FIG. 19 is a top view of the collar sending unit of the collar sorting/sending unit of the present invention.

The details of the sorting bowl structure and operation will be described with reference to FIGS. 16, 17, 18, 18A, and 18B. As can be appreciated from FIGS. 18 and 18A, the radial slope of the helical ramp 508 changes drastically between section 534 at an initial portion of the ramp 508 and latter section 536. As shown in FIG. 18A, the ramp 508 has a slightly negative slope progressing radially outwardly at section 534. This is to cause the collars progressing up the ramp to tend to slide toward the outer wall 535 and thus stay on the ramp. At section 536, on the other hand, the ramp has a sharp positive slope extending radially outwardly. The sharp radial slope at section 536 combined with the rail 538 and the deflector 530 insures that only flange-down collars progressing one at a time proceed past section 536 toward the exit 514.

As a collar progresses past section 536, if it is flange-down on the ramp, the lower edge of the flange is engaged behind a portion of the rail 538 extending above the surface of the ramp at section 536. The rail thus prevents the collar from sliding off the ramp. On the other hand, if the collar is on the ramp flange side up, the steep slope of section 536 combined with the relatively high center of gravity of the collar due to it being flange side up, causes the collar to tip over the rail 538 and off of section 536 of the ramp. In addition, collars that are stacked one above the other or collars that are resting on their flange edges, are caused to fall off of section 536 by the sloped section 532 of the deflector 530 if they have not already fallen off of the ramp due to the steep radial slope before reaching section 536.

After the collars move past section 536, they are oriented in an essentially single file, flange down arrangement progressing toward the queuing section 550. At the queuing section 550 of the ramp, a number of collar hold down devices 542 and 544 are provided to hold the collars down in an orderly fashion. In addition, a downwardly sloped section 552 diverts excess collars downwardly off the queuing section 550 so that an excessive number of collars does not pile up at the queuing section 550. Excessive collar buildup increases the chances for collar jams. As shown in FIG. 18B, at the terminating point 514 of the helical ramp 508, a collar retainer 548 is provided. The collar sending unit 560 attaches to the sorting bowl at 554.

Details of the collar sending unit 560 will be explained with reference to FIGS. 17 and 19–21. The sending unit 560 generally includes a unit body 564 to which is attached the sending tube 102, an air cylinder 562, a collar send pneumatic attachment 568, a collar pick-up pneumatic attachment 570 and a collar blow-down pneumatic attachment 566.

Figure 21:
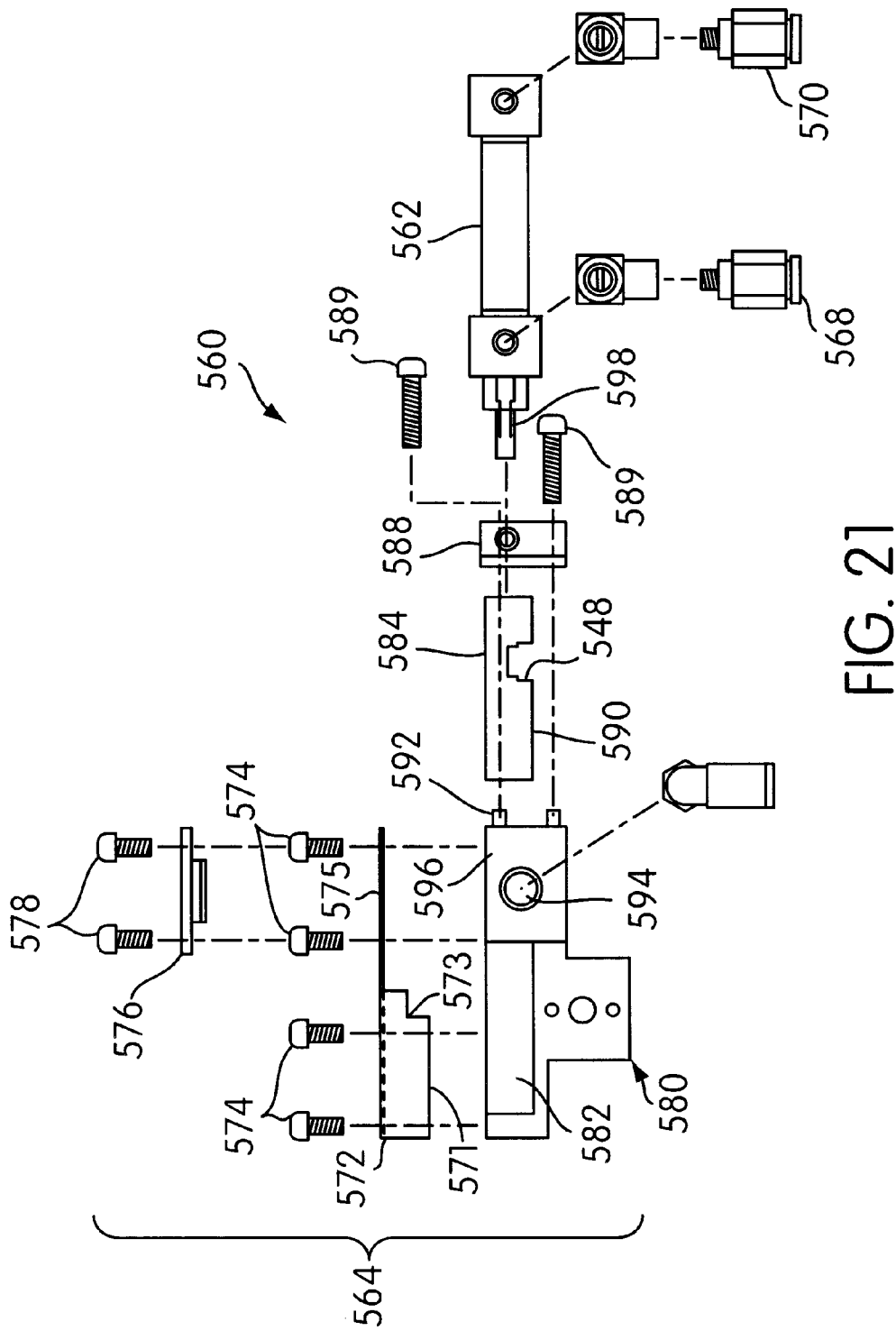
FIG. 21 is an exploded elevation of the collar sending unit of the collar sorting/sending unit of the present invention.

Details of the inner construction of the collar sending unit 560 are shown in FIG. 21 which is an exploded view of an exemplary embodiment of the collar sending unit. The collar sending unit 560 comprises a main body 580 having an open channel 582 formed therein. The channel 582 is open upwardly and laterally for a portion of the main body 580 (the left side as shown in FIG. 21) and is open only upwardly where sidewall section 596 is located. A through hole 594 extends all the way through main body 580 and is aligned with sending tube 102.

Shuttle shield 572 has a horizontal top surface 575 and a vertical side surface 571 extending from one edge of the top surface 575 and at generally a right angle thereto. Side surface 571 is shorter in length than top surface 575, whose length corresponds to that of the main body 580. In addition, as can be appreciated from FIGS. 20 and 21, the overall length of side surface 571 of the shuttle shield 572 is shorter than the length of the open portion of the channel 582. In addition, side surface 571 preferably includes a 90° notch 573 cut into a lower right-hand corner thereof. Shuttle shield 572 is fastened to main body 580 by a plurality of fasteners 574, and a cover member 576 is fixed atop the main body 580 by means of fasteners 578.

A shuttle 584 is slidably disposed within the channel 582 of the main body 580. Shuttle 584 is preferably rectangular in cross-section and has a solid portion 590 and a notched portion which corresponds to collar retainer 548. Notch 548 is wider at the bottom thereof than at the top thereof to permit only correctly oriented (i.e., flange-down) collars to enter the shuttle 584. The shuttle 584 is shorter in length than channel 582 and therefore is movable between a far right position and a far left position therein.

With the shuttle 584 installed in the channel 582, an air cylinder mount 588 is affixed to the main body 580 by means of dowels 592 and fasteners 589.

The air cylinder 562, having an air piston 598 disposed therein, is attached to the air cylinder mount 588 and the air piston 598 is attached to the shuttle 584.

In the at rest position, the collar pick up pneumatic control 568 is pressurized to extend the air piston and the shuttle 584 into the channel 582 (to the left as shown in the figures). With the shuttle 584 pushed fully to the end of the channel 582, collar retainer 548 is aligned with the terminating point 514 of the helical ramp 508 of the sorting bowl 502. As can be appreciated from FIG. 20, the right angle notch 573 and the open portion of the channel 582 provides an opening permitting the collar to enter into the housing and into the retainer 548. The width of the shuttle 584 is approximately the same as the diameter of a single collar so that only a single collar 90 may enter the collar retainer 548 at one time. When the PLC signals for another collar to be sent to the ACFD, the collar send side 570 of the air piston 598 is pressurized and the collar pick up side is depressurized to move the shuttle to the right. With the shuttle moved to the right, the retainer 548 is aligned with the through hole 594 and collar feed tube 102. A blast of air from the collar blow down attachment 566, also aligned with through hole 594, sends the collar into the collar feed tube 102 and toward the collar transfer device 100 of the ACFD. At that point, the collar pick up side of 568 of the air cylinder 562 is pressurized, moving the shuttle 584 back to the left, thus aligning the shuttle retainer 548 with the channel opening at the terminating point 514 of the helical ramp 508 so as to pick up the next collar.

Figure 20:
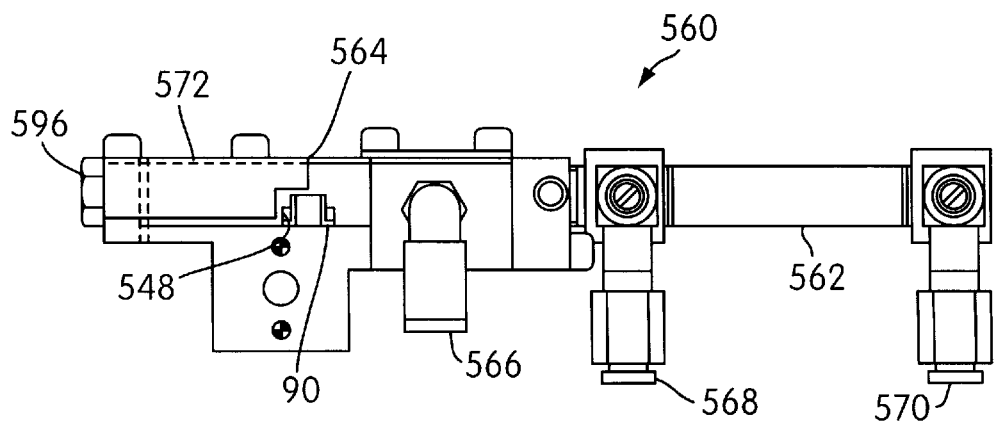
FIG. 20 is a side elevation of the collar sending unit of the collar sorting/sending unit of the present invention.

Note in FIG. 2B that collar 130 is disposed within the tube 102 flange-side-up, whereas the collar 90 in the collar sending unit 560 of FIG. 20 is flange-side-down. Tube 102 preferably has a twist between sending unit 560 and transfer device 100 so as to invert the collar.

While the invention has been described in connection with what is presently considered to be the most practical and preferred embodiments, it is to be understood that the invention is not to be limited to the disclosed embodiments, but, on the contrary, it is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

What is claimed is:

1. An assembly tool for installing a fastener element, said assembly tool comprising:
   a fastener element transfer device including a moving body and a fastener element holding member attached thereto, said fastener element transfer device being constructed and arranged to receive a fastener element from a fastener source, hold the fastener element in said fastener element holding member, and move the fastener element from a receiving position to a transfer position as said moving body moves from a first position to a second position;
   a fastener element installing mechanism including structure constructed and arranged to capture a fastener element moved to said transfer position by said fastener element transfer device and to install the fastener element on a work piece, said fastener element installing mechanism being moveable between (1) a fastener element receiving configuration permitting said fastener element transfer device to move the fastener element from said receiving position to said transfer position as said moving body moves from said first position to said second position, (2) a fastener element capture configuration in which said fastener element installing mechanism removes the fastener element from said fastener element holding member as said moving body moves from said second position to said first position, and (3) a fastener element installing configuration in which said fastener element installing mechanism installs the fastener element on the work piece; and
   one or more status indicators associated with said fastener element transfer device and constructed and arranged with respect to said fastener element transfer device to indicate if said moving body is in said first or second position and to indicate if a fastener element is disposed in said fastener element holding member when said moving body is in said first position, said one or more status indicators associated with said fastener element transfer device include first and second optical sensor switches, each comprising an emitter-receiver pair, wherein the emitter and the receiver of each of said first and second optical sensor switches are disposed on opposite sides of said fastener element transfer device and said fastener element transfer device includes a first aperture formed through said moving body and a second aperture formed through said fastener element holding member, the emitter and the receiver of said first optical sensor switch being aligned with said first aperture and the emitter and the receiver of said second optical sensor switch being aligned with said second aperture when said moving body is in said first position, and the emitter and the receiver of said second optical sensor switch being aligned with said first aperture when said moving body is in said second position.

2. An assembly tool for installing a fastener element, said assembly tool comprising:
   a fastener element transfer device including a moving body and a fastener element holding member attached thereto, said fastener element transfer device being constructed and arranged to receive a fastener element from a fastener source, hold the fastener element in said fastener element holding member, and move the fastener element from a receiving position to a transfer position as said moving body moves from a first position to a second position;
   a fastener element installing mechanism including structure constructed and arranged to capture a fastener element moved to said transfer position by said fastener element transfer device and to install the fastener element on a work piece, said fastener element installing mechanism being moveable between (1) a fastener element receiving configuration permitting said fastener element transfer device to move the fastener element from said receiving position to said transfer position as said moving body moves from said first position to said second position, (2) a fastener element capture configuration in which said fastener element installing mechanism removes the fastener element from said fastener element holding member as said moving body moves from said second position to said first position, and (3) a fastener element installing configuration in which said fastener element installing mechanism installs the fastener element on the work piece; and
   one or more status indicators associated with said fastener element transfer device and constructed and arranged with respect to said fastener element transfer device to indicate if said moving body is in said first or second position and to indicate if a fastener element is disposed in said fastener element holding member when said moving body is in said first position,
   said assembly tool also comprising: one or more status indicators associated with said fastener element installing mechanism and constructed and arranged with respect to said fastener element installing mechanism to indicate:

(1) if said fastener element installing mechanism is in said receiving configuration so that said fastener element transfer device can move the fastener element from said receiving position to said transfer position, (2) if a fastener element has been moved into said transfer position when said moving body is in said second position, (3) if said fastener element installing mechanism is in said fastener element capture configuration, and (4) if said fastener element installing mechanism followed to install the fastener element on the work piece, said fastener element installing mechanism further comprising:

a housing structure defining an elongated passageway therethrough having an open end, said housing structure having a fastener element reception opening formed therein transversely to said passageway through which said fastener element transfer device is extendible to move a fastener element to said transfer position within said passageway;

an anvil cylinder disposed adjacent said housing structure and defining an inner cylindrical bore that is generally coaxial with said passageway, said cylindrical bore being closed at one end and having a piston stop with a central opening formed therein at an opposite end;

an anvil piston having a piston head portion disposed for movement within said inner cylindrical bore and a piston shaft portion extending through said central opening and into said passageway;

a fastener element installing anvil carried on an end of said piston shaft portion; and a fastener element locating pin disposed for axial movement within a central axial opening formed through said fastener element installing anvil and said piston shaft portion.

3. The assembly tool of claim 2, wherein said one or more status indicators associated with said fastener element installing mechanism comprises:

a first optical sensor comprising a first emitter-receiver pair and generating a signal when a beam emitted by said first emitter is received by said first receiver, said first emitter and said first receiver being disposed on opposite sides of said passageway generally adjacent said fastener element reception opening; and an anvil piston position sensor disposed adjacent said passageway and constructed and arranged to generate a signal when said fastener element installing mechanism is in said receiving configuration so that said fastener element transfer device can move from said receiving position to said transfer position, wherein said fastener element holding member of said fastener element transfer device includes an aperture formed therethrough, said aperture being aligned with said first emitter-receiver pair when said moving body is in said second position to permit the beam emitted by said first emitter to pass through said aperture and be received by said first receiver when no fastener element is held in said fastener element holding member to generate a signal to indicate that no fastener element is held in said fastener element holding member, said aperture being blocked by a fastener element held in said fastener element holding member to prevent the beam emitted by said first emitter from being received by said first receiver when said moving body is in said second position to indicate that a fastener element is held in said transfer position in said fastener element holding member.

4. The assembly tool of claim 3, wherein said fastener element locating pin includes a transverse aperture formed through an end thereof and said end extends above said fastener element installing anvil when said fastener element installing mechanism is in said fastener element capture configuration, wherein said transverse aperture through the end of said fastener element locating pin is aligned with said first emitter-receiver pair when said fastener element installing mechanism is in said fastener element capture configuration to permit the beam emitted by said first emitter to pass through said transverse aperture and be received by said first receiver when no fastener element is carried by said fastener element installing anvil to generate a signal to indicate that no fastener element is carried by said fastener element installing anvil, said transverse aperture being blocked by a fastener element carried by said fastener element installing anvil to prevent the beam emitted by said first emitter from being received by said first receiver to indicate that a fastener element is carried by said fastener element installing anvil.

5. The assembly tool of claim 3, said one or more status indicators associated with said fastener element installing mechanism further comprising:

a second optical sensor comprising a second emitter-receiver pair defining a sensor axis therebetween and generating a signal when a beam emitted by said second emitter is received by said second receiver, said second emitter and said second receiver being disposed on opposite sides of said passageway at a position spaced apart from said first optical sensor; wherein said fastener element locating pin includes a transverse aperture formed through an intermediate portion thereof and said housing structure includes slots formed in walls thereof extending in a direction parallel to said fastener element locating pin, said fastener element locating pin further includes a transverse dowel extending laterally therefrom and disposed within said slots to keep said transverse aperture formed through the intermediate portion of said fastener element locating pin oriented in the same direction as said sensor axis as said fastener element locating pin moves axially within the central axial opening formed through said fastener element installing anvil and said piston shaft portion, said fastener element locating pin being spring-biased so that an end portion thereof protrudes from the central opening formed in said fastener element installing anvil and engages a cooperating fastener shaft on which a fastener element carried by said fastener element installing anvil is to be installed by said fastener element installing mechanism when said fastener element installing mechanism is in said fastener element installing configuration, engagement of said fastener element locating pin with said cooperating fastener shaft causing said fastener element locating pin to move against the spring bias into the central axial opening, wherein said fastener element locating pin is constructed and arranged so that (1) a beam emitted by said second emitter passes through said transverse aperture formed through the intermediate portion of said fastener element locating pin and is received by said second receiver when said fastener element installing mechanism is in said fastener element installing configuration and the fastener shaft moves said fastener element locating pin into the central axial opening to a position in which said second emitter-receiver pair is aligned with said transverse aperture to indicate that a fastener shaft of proper length is positioned to have the fastener element installed thereon and (2) said transverse aperture is not aligned with said second emitter-receiver pair thereby preventing the beam emitted by said second emitter from being received by said second receiver when said fastener element installing mechanism is in said fastener element installing configuration and the fastener shaft does not move said fastener element locating pin into the central axial opening to a position in which said second emitter-receiver pair is aligned with said transverse aperture to indicate that the fastener shaft has an improper length or that no fastener shaft is positioned to have the fastener element installed thereon.

6. An assembly tool for installing a fastener element, said assembly tool comprising:

a fastener element transfer device including a moving body and a fastener element holding member attached thereto, said fastener element transfer device being constructed and arranged to receive a fastener element from a fastener source, hold the fastener element in said fastener element holding member, and move the fastener element from a receiving position to a transfer position as said moving body moves from a first position to a second position;

a fastener element installing mechanism including structure constructed and arranged to capture a fastener element moved to said transfer position by said fastener element transfer device and to install the fastener element on a work piece, said fastener element installing mechanism being moveable between (1) a fastener element receiving configuration permitting said fastener element transfer device to move the fastener element from said receiving position to said transfer position as said moving body moves from said first position to said second position, (2) a fastener element capture configuration in which said fastener element installing mechanism removes the fastener element from said fastener element holding member as said moving body moves from said second position to said first position, and (3) a fastener element installing configuration in which said fastener element installing mechanism installs the fastener element on the work piece; and one or more status indicators associated with said fastener element transfer device and constructed and arranged with respect to said fastener element transfer device to indicate if said moving body is in said first or second position and to indicate if a fastener element is disposed in said fastener element holding member when said moving body is in said first position, said fastener element transfer device further including a conduit connected to said moving body for transmitting a fastener element from a remote source of fastener elements to said fastener element transfer device, wherein said moving body defines a fastener element passageway connecting said conduit to said fastener element holding member.

7. An assembly tool for installing a fastener element, said assembly tool comprising:

a fastener element transfer device including a moving body and a fastener element holding member attached thereto, said fastener element transfer device being constructed and arranged to receive a fastener element from a fastener source, hold the fastener element in said fastener element holding member, and move the fastener element from a receiving position to a transfer position as said moving body moves from a first position to a second position;

a fastener element installing mechanism including structure constructed and arranged to capture a fastener element moved to said transfer position by said fastener element transfer device and to install the fastener element on a work piece, said fastener element installing mechanism being moveable between (1) a fastener element receiving configuration permitting said fastener element transfer device to move the fastener element from said receiving position to said transfer position as said moving body moves from said first position to said second position, (2) a fastener element capture configuration in which said fastener element installing mechanism removes the fastener element from said fastener element holding member as said moving body moves from said second position to said first position, and (3) a fastener element installing configuration in which said fastener element installing mechanism installs the fastener element on the work piece; and one or more status indicators associated with said fastener element transfer device and constructed and arranged with respect to said fastener element transfer device to indicate if said moving body is in said first or second position and to indicate if a fastener element is disposed in said fastener element holding member when said moving body is in said first position, said one or more status indicators associated with said fastener element transfer device comprising:

a first optical sensor comprising a first emitter-receiver pair and generating a signal when a beam emitted by said first emitter is received by said first receiver, said first emitter and said first receiver being positioned on opposite sides of said fastener element transfer device; and a second optical sensor disposed at a spaced-apart position from said first optical sensor and comprising a second emitter-receiver pair and generating a signal when a beam emitted by said second emitter is received by said second receiver, said second emitter and said second receiver being positioned on opposite sides of said fastener element transfer device, wherein said moving body includes a first aperture formed therethrough and said fastener element holding member includes a second aperture formed therethrough, said first aperture being aligned with said first emitter-receiver pair when said moving body is in said first position to permit the beam emitted by said first emitter to pass through said first aperture and be received by said first receiver to generate a signal from said first emitter-receiver pair to indicate that said moving body is in said first position, said second aperture being aligned with said second emitter-receiver pair when said moving body is in said first position to permit the beam emitted by said second emitter to pass through said second aperture and be received by said second receiver when no fastener element is held in said fastener element holding member to generate a signal to indicate that no fastener element is held in said fastener element holding member, said second aperture being blocked by a fastener element held in said fastener element holding member to prevent the beam emitted by a second emitter from being received by said second receiver to indicate that a fastener element is held in said fastener element holding member, said first aperture being aligned with said second emitter-receiver pair when said moving body is in said second position to permit the beam emitted by said second emitter to pass through said first aperture and be received by a second receiver while the beam emitted by said first emitter is prevented by said moving body from being received by said first receiver to indicate that said moving body is in said second position.

8. An assembly for serially feeding fastener elements of a type having a generally cylindrical body with a radially extending flange at one end thereof to a tool for installing the fastener elements, said assembly comprising:

a fastener element sorting mechanism comprising a vibrating hopper and a helical path around an outer perimeter of said vibrating hopper, said helical path ending at a termination point, whereby vibration of said vibrating hopper causes fastener elements contained within said vibrating hopper to traverse said helical path toward said termination point, said fastener element sorting mechanism further including fastener element arranging and orienting structure along a portion of said helical path for providing a supply of fastener elements at said termination point arranged generally one behind the other and all oriented with their radially extending flanges down, said fastener element arranging and orienting structure comprising:

a rail structure projecting above an inner edge of said helical path for an extent of said helical path, said rail structure being provided at a portion of said helical path at which said helical path has a downward transverse slope toward the inner edge of said helical path causing fastener elements traversing that portion of said helical path to slide toward the inner edge of said helical path, wherein said rail structure is constructed and arranged to prevent fastener elements disposed on said helical path and oriented with their radially extending flanges below the projecting rail structure from sliding down said transverse slope and off said helical path and to allow fastener elements disposed on said helical path and oriented with their radially extending flanges above the projecting rail structure to roll over the projecting rail structure and off the extent of the helical path so that all fastener elements which reach the termination point are oriented with their radially extending flanges down; and a fastener element deflector mounted on said helical path adjacent said projecting rail structure at a position where said helical path has a downward transverse slope toward the inner edge of said helical path, said fastener element deflector being spaced from said projecting rail by a distance permitting only one fastener element at a time to pass between said projecting rail and said fastener element deflector so that fastener elements traversing said helical path that are supported by said projecting rail structure can pass between said projecting rail structure and said fastener element deflector and fastener elements traversing said helical path that are supported by other fastener elements that are supported by said projecting rail are deflected by said fastener element deflector off the extent of said helical path toward the central portion of said hopper so that fastener elements which traverse said helical path past said fastener element deflector are generally arranged one behind the other;

a fastener element sending unit disposed at said termination point and including a moving fastener element shuttle member, said fastener element shuttle member being constructed and arranged to take one fastener element at a time from the supply of fastener elements at said termination point and move the fastener element to a sending position within said fastener element sending unit; and a fastener element transport conduit extending from said fastener element sending unit to the tool, wherein said fastener element sending unit is constructed and arranged to propel the fastener element moved to said sending position through said fastener element transport conduit to the tool.

9. The assembly of claim 8, wherein beyond said fastener element deflector a transverse slope of said helical path changes from a downward transverse slope toward an inner edge of said helical path to a downward transverse slope toward an outer edge of said helical path which causes fastener elements that pass said slope transition point to slide to the outer edge of said helical path and against an outer wall of said vibrating hopper, and wherein said helical path includes an extent preceding said termination point having a first sloped portion adjacent said outer wall with a downward transverse slope toward the outer edge of said helical path and a second sloped portion adjacent the inner edge of said helical path with a downward transverse slope toward the inner edge of said helical path, said first portion having a maximum width corresponding generally to a width of a fastener element so that only a single line of fastener elements is disposed against the outer wall adjacent said termination point and any fastener elements which arrive at said termination point alongside said single line of fastener elements encounter said second sloped portion and slide off the inner edge of said helical path.

10. The assembly of claim 8 said fastener element sending unit comprising:

a main body structure defining a passage within which said fastener element shuttle member is movably disposed, a proximal end of said fastener element transport conduit being connected to said main body structure, said main body structure having an entrance opening connecting one side of said passage with said termination point, and an exit opening connecting an opposite side of said passage with said fastener element transport conduit, said fastener element shuttle member including a fastener element receiving cavity extending therethrough which is sized to receive a single fastener element;

a fluid pressure element connected to said main body structure and defining therein a fluid pressure cylinder;

a fluid pressure piston connected at one end to said fastener element shuttle member and disposed within said fluid pressure cylinder for movement in response to fluid pressure applied to said fluid pressure piston to move said fastener element shuttle member between a fastener element pick up position in which said fastener element receiving cavity is aligned with said entrance opening to receive a single fastener element from the supply of fastener elements at said termination point and said sending position in which said fastener element receiving cavity and said fastener element disposed within said fastener element receiving cavity are aligned with said exit opening; and a pneumatic line connected to said main body structure and communicating with said passage at a position aligned with said exit opening on a side of said passage opposite said exit opening, said pneumatic line being constructed and arranged to dispense an impulse of air into said passage when said fastener element receiving cavity and said fastener element disposed within said fastener element receiving cavity are aligned with said exit opening to propel said fastener element out of said fastener element receiving cavity, through said exit opening, and into said fastener element transport conduit toward the tool.

11. An assembly tool for installing a fastener element, said assembly tool comprising:

a fastener element transfer device including a moving body and a fastener element holding member attached thereto, said fastener element transfer device being constructed and arranged to receive a fastener element from a fastener source, hold the fastener element in said fastener element holding member, and move the fastener element from a receiving position to a transfer position as said moving body moves from a first position to a second position;

a fastener element installing mechanism including structure constructed and arranged to capture a fastener element moved to said transfer position by said fastener element transfer device and to install the fastener element on a work piece, said fastener element installing mechanism being moveable between (1) a fastener element receiving configuration permitting said fastener element transfer device to move the fastener element from said receiving position to said transfer position as said moving body moves from said first position to said second position, (2) a fastener element capture configuration in which said fastener element installing mechanism removes the fastener element from said fastener element holding member as said moving body moves from said second position to said first position, and (3) a fastener element installing configuration in which said fastener element installing mechanism installs the fastener element on the work piece;

one or more status indicators associated with said fastener element transfer device and constructed and arranged with respect to said fastener element transfer device to indicate if said moving body is in said first or second position and to indicate if a fastener element is disposed in said fastener element holding member when said moving body is in said first position;

a fastener element sorting mechanism having a central bowl structure and a fastener element sorting path having a termination point, said fastener element sorting mechanism being constructed and arranged to move fastener elements from said bowl structure along said fastener element sorting path toward said termination point, said fastener element sorting mechanism further including fastener element arranging and orienting structure along a portion of said fastener element sorting path for providing a supply of fastener elements at said termination point arranged generally one behind the other and all oriented with their radially extending flanges down;

a fastener element sending unit disposed at said termination point and including a moving fastener element shuttle member, said fastener element shuttle member being constructed and arranged to take one fastener element at a time from the supply of fastener elements at said termination point and move the fastener element to a sending position within said fastener element sending unit; and a fastener element transport conduit extending from said fastener element sending unit to said fastener element transfer device, wherein said fastener element sending unit is constructed and arranged to propel the fastener element moved to said sending position through said fastener element transport conduit to said fastener element transfer device.

12. The assembly tool of claim 11 further comprising:

one or more status indicators associated with said fastener element installing mechanism and constructed and arranged with respect to said fastener element installing mechanism to indicate:

(1) if said fastener element installing mechanism is in said receiving configuration so that said fastener element transfer device can move the fastener element from said receiving position to said transfer position, (2) if a fastener element has been moved into said transfer position when said moving body is in said second position, (3) if said fastener element installing mechanism is in said fastener element capture configuration, and (4) if said fastener element installing mechanism failed to install the fastener element on the work piece.

13. The assembly tool of claim 12 wherein said fastener element installing mechanism is constructed and arranged to install a locking fastener element onto a cooperating fastener element inserted through an aperture formed in the work piece and wherein said one or more status indicators associated with said fastener element installing mechanism are constructed and arranged to indicate if a cooperating fastener element has been properly inserted into the aperture formed in the work piece.

14. The assembly tool of claim 12, wherein each of said one or more status indicators associated with said fastener element installing mechanism comprises an optical sensor switch comprising an emitter-receiver pair.

15. The assembly tool of claim 12, wherein said fastener element installing mechanism comprises:

a housing structure defining an elongated passageway therethrough having an open end, said housing structure having a fastener element reception opening formed therein transversely to said passageway through which said fastener element transfer device is extendible to move a fastener element to said transfer position within said passageway;

an anvil cylinder disposed adjacent said housing structure and defining an inner cylindrical bore that is generally coaxial with said passageway, said cylindrical bore being closed at one end and having a piston stop with a central opening formed therein at an opposite end;

an anvil piston having a piston head portion disposed for movement within said inner cylindrical bore and a piston shaft portion extending through said central opening and into said passageway;

a fastener element installing anvil carried on an end of said piston shaft portion; and a fastener element locating pin disposed for axial movement within a central axial opening formed through said fastener element installing anvil and said piston shaft portion.

16. The assembly tool of claim 15 said one or more status indicators associated with said fastener element transfer device comprising:
- a first optical sensor comprising a first emitter-receiver pair and generating a signal when a beam emitted by said first emitter is received by said first receiver, said first emitter and said first receiver being positioned on opposite sides of said fastener element transfer device; and
- a second optical sensor disposed at a spaced-apart position from said first optical sensor and comprising a second emitter-receiver pair and generating a signal when a beam emitted by said second emitter is received by said second receiver, said second emitter and said second receiver being positioned on opposite sides of said fastener element transfer device,
- wherein said moving body includes a first aperture formed therethrough and said fastener element holding member includes a second aperture formed therethrough, said first aperture being aligned with said first emitter-receiver pair when said moving body is in said first position to permit the beam emitted by said first emitter to pass through said first aperture and be received by said first receiver to generate a signal from said first emitter-receiver pair to indicate that said moving body is in said first position, said second aperture being aligned with said second emitter-receiver pair when said moving body is in said first position to permit the beam emitted by said second emitter to pass through said second aperture and be received by said second receiver when no fastener element is held in said fastener element holding member to generate a signal to indicate that no fastener element is held in said fastener element holding member, said second aperture being blocked by a fastener element held in said fastener element holding member to prevent the beam emitted by a second emitter from being received by said second receiver to indicate that a fastener element is held in said fastener element holding member, said first aperture being aligned with said second emitter-receiver pair when said moving body is in said second position to permit the beam emitted by said second emitter to pass through said first aperture and be received by a second receiver while the beam emitted by said first emitter is prevented by said moving body from being received by said first receiver to indicate that said moving body is in said second position.

17. The assembly tool of claim 16, wherein said one or more status indicators associated with said fastener element installing mechanism comprises:
- a third optical sensor comprising a first emitter-receiver pair and generating a signal when a beam emitted by said third emitter is received by said third receiver, said third emitter and said third receiver being disposed on opposite sides of said passageway generally adjacent said fastener element reception opening; and
- an anvil piston position sensor disposed adjacent said passageway and constructed and arranged to generate a signal when said fastener element installing mechanism is in said receiving configuration so that said fastener element transfer device can move from said receiving position to said transfer position,
- wherein, said second aperture formed through said fastener element holding member is aligned with said third emitter-receiver pair when said moving body is in said second position to permit the beam emitted by said third emitter to pass through said second aperture and be received by said third receiver when no fastener element is held in said fastener element holding member to generate a signal to indicate that no fastener element is held in said fastener element holding member, said second aperture being blocked by a fastener element held in said fastener element holding member to prevent the beam emitted by said third emitter from being received by said third receiver when said moving body is in said second position to indicate that a fastener element is held in said transfer position in said fastener element holding member.

18. The assembly tool of claim 17, wherein said fastener element locating pin includes a first transverse aperture formed through an end thereof and said end extends above said fastener element installing anvil when said fastener element installing mechanism is in said fastener element capture configuration, wherein said first transverse aperture through the end of said fastener element locating pin is aligned with said third emitter-receiver pair when said fastener element installing mechanism is in said fastener element capture configuration to permit the beam emitted by said third emitter to pass through said first transverse aperture and be received by said third receiver when no fastener element is carried by said fastener element installing anvil to generate a signal to indicate that no fastener element is carried by said fastener element installing anvil, said first transverse aperture being blocked by a fastener element carried by said fastener element installing anvil to prevent the beam emitted by said third emitter from being received by said third receiver to indicate that a fastener element is carried by said fastener element installing anvil.

19. The assembly tool of claim 18, said one or more status indicators associated with said fastener element installing mechanism further comprising:
- a fourth optical sensor comprising a fourth emitter-receiver pair defining a sensor axis therebetween and generating a signal when a beam emitted by said fourth emitter is received by said fourth receiver, said fourth emitter and said fourth receiver being disposed on opposite sides of said passageway at a position spaced apart from said third optical sensor; wherein said fastener element locating pin includes a second transverse aperture formed through an intermediate portion thereof and said housing structure includes slots formed in walls thereof extending in a direction parallel to said fastener element locating pin, said fastener element locating pin further includes a transverse dowel extending laterally therefrom and disposed within said slots to keep said second transverse aperture formed through the intermediate portion of said fastener element locating pin oriented in the same direction as said sensor axis as said fastener element locating pin moves axially within the central axial opening formed through said fastener element installing anvil and said piston shaft portion,
- said fastener element locating pin being spring-biased so that an end portion thereof protrudes from the central opening formed in said fastener element installing anvil and engages a cooperating fastener shaft on which a fastener element carried by said fastener element installing anvil is to be installed by said fastener element installing mechanism when said fastener element installing mechanism is in said fastener element installing configuration, engagement of said fastener element locating pin with the cooperating fastener shaft causing said fastener element locating pin to move against the spring bias into the central axial opening, wherein said fastener element locator pin is constructed and arranged so that (1) a beam emitted by said fourth emitter passes through said second transverse aperture formed through the intermediate portion of said fastener element locating pin and is received by said fourth receiver when said fastener element installing mechanism is in said fastener element installing configuration and the fastener shaft moves said fastener element locating pin into the central axial opening to a position in which said fourth emitter-receiver pair is aligned with said second transverse aperture to indicate that a fastener shaft of proper length is positioned to have the fastener element installed thereon and (2) said second transverse aperture is not aligned with said fourth emitter-receiver pair thereby preventing the beam emitted by said fourth emitter from being received by said fourth receiver when said fastener element installing mechanism is in said fastener element installing configuration and the fastener shaft does not move said fastener element locating pin into the central axial opening to a position in which said fourth emitter-receiver pair is aligned with said second transverse aperture to indicate that the fastener shaft has an improper length or that no fastener shaft is positioned to have the fastener element installed thereon.

20. The assembly tool of claim 11, wherein each of said one or more status indicators associated with said fastener element transfer device comprises an optical sensor switch comprising an emitter-receiver pair.

21. The assembly tool of claim 11, wherein said one or more status indicators associated with said fastener element transfer device include first and second optical sensor switches, each comprising an emitter-receiver pair, wherein the emitter and the receiver of each of said first and second optical sensor switches are disposed on opposite sides of said fastener element transfer device and said fastener element transfer device includes a first aperture formed through said moving body and a second aperture formed through said fastener element holding member, the emitter and the receiver of said first optical sensor switch being aligned with said first aperture and the emitter and the receiver of said second optical sensor switch being aligned with said second aperture when said moving body is in said first position, and the emitter and the receiver of said second optical sensor switch being aligned with said first aperture when said moving body is in said second position.

22. The assembly tool of claim 11, wherein said central bowl structure comprises a vibrating hopper and said fastener element sorting path comprises a helical path around an outer perimeter of said vibrating hopper, said helical path ending at said termination point, whereby vibration of said vibrating hopper causes fastener elements contained within said vibrating hopper to traverse said helical path toward said termination point, and wherein said fastener element arranging and orienting structure comprises:

a rail structure projecting above an inner edge of said helical path for an extent of said helical path, said rail structure being provided at a portion of said helical path at which said helical path has a downward transverse slope toward the inner edge of said helical path causing fastener elements traversing that portion of said helical path to tend to slide toward the inner edge of said helical path, wherein said rail structure is constructed and arranged to prevent fastener elements disposed on said helical path and oriented with their radially extending flanges below the projecting rail structure from sliding down said transverse slope and off said helical path and to allow fastener elements disposed on said helical path and oriented with their radially extending flanges above the projecting rail structure to roll over the projecting rail structure and off the extent of the helical path so that all fastener elements which reach the termination point are oriented with their radially extending flanges down; and a fastener element deflector mounted on said helical path adjacent said projecting rail structure at a position where said helical path has a downward transverse slope toward the inner edge of said helical path, said fastener element deflector being spaced from said projecting rail by a distance permitting only one fastener element at a time to pass between said projecting rail and said fastener element deflector so that fastener elements traversing said helical path that are supported by said projecting rail structure can pass between said projecting rail structure and said fastener element deflector and fastener elements traversing said helical path that are supported by other fastener elements that are supported by said projecting rail are deflected by said fastener element deflector off the extent of said helical path toward the central portion of said hopper so that fastener elements which traverse said helical path past said fastener element deflector are generally arranged one behind the other.

23. The assembly tool of claim 22, wherein beyond said fastener element deflector a transverse slope of said helical path changes from a downward transverse slope toward an inner edge of said helical path to a downward transverse slope toward an outer edge of said helical path which causes fastener elements that pass said slope transition point to slide to the outer edge of said helical path and against an outer wall of said vibrating hopper, and wherein said helical path includes an extent preceding said termination point having a first sloped portion adjacent said outer wall with a downward transverse slope toward the outer edge of said helical path and a second sloped portion adjacent the inner edge of said helical path with a downward transverse slope toward the inner edge of said helical path, said first portion having a maximum width corresponding generally to a width of a fastener element so that only a single line of fastener elements is disposed against the outer wall adjacent said termination point and any fastener elements which arrive at said termination point alongside said single line of fastener elements encounter said second sloped portion and slide off the inner edge of said helical path.

24. The assembly tool of claim 11 said fastener element sending unit comprising:

a main body structure defining a passage within which said fastener element shuttle member is movably disposed, a proximal end of said fastener element transport conduit being connected to said main body structure, said main body structure having an entrance opening connecting with one side of said passage with said termination point, and an exit opening connecting an opposite side of said passage with said fastener element transport conduit, said fastener element shuttle member including a fastener element receiving cavity extending therethrough which is sized to receive a single fastener element;

a fluid pressure element connected to said main body structure and defining therein a fluid pressure cylinder;

a fluid pressure piston connected at one end to said fastener element shuttle member and disposed within said fluid pressure cylinder for movement in response to fluid pressure applied to said fluid pressure piston to move said fastener element shuttle member between a fastener element pick up position in which said fastener element receiving cavity is aligned with said entrance opening to receive a single fastener element from the supply of fastener elements at said termination point and said sending position in which said fastener element receiving cavity and said fastener element disposed within said fastener element receiving cavity are aligned with said exit opening; and a pneumatic line connected to said main body structure and communicating with said passage at a position aligned with said exit opening on a side of said passage opposite said exit opening, said pneumatic line being constructed and arranged to dispense an impulse of air into said passage when said fastener element receiving cavity and said fastener element disposed within said fastener element receiving cavity are aligned with said exit opening to propel said fastener element out of said fastener element receiving cavity, through said exit opening, and into said fastener element transport conduit toward the tool.

* * * * *